(12) United States Patent
Justice et al.

(10) Patent No.: US 9,564,102 B2
(45) Date of Patent: Feb. 7, 2017

(54) CLIENT SIDE PROCESSING OF PLAYER MOVEMENT IN A REMOTE GAMING ENVIRONMENT

(71) Applicant: MICROSOFT TECHNOLOGY LICENSING, LLC

(72) Inventors: John Raymond Justice, Redmond, WA (US); J. Andrew Goossen, Redmond, WA (US); David S. Wu, Redmond, WA (US); Habib Zargarpour, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 14/180,043

(22) Filed: Feb. 13, 2014

(65) Prior Publication Data
US 2014/0267429 A1    Sep. 18, 2014

Related U.S. Application Data

(60) Provisional application No. 61/783,351, filed on Mar. 14, 2013.

(51) Int. Cl.
*G09G 5/00* (2006.01)
*G06T 3/60* (2006.01)
(Continued)

(52) U.S. Cl.
CPC ............ *G09G 5/006* (2013.01); *A63F 13/12* (2013.01); *G06T 1/20* (2013.01); *G06T 3/60* (2013.01); *A63F 2300/538* (2013.01)

(58) Field of Classification Search
None
See application file for complete search history.

(56) References Cited

U.S. PATENT DOCUMENTS 5,838,909 A    11/1998    Roy et al.
6,038,599 A    3/2000    Black et al.
(Continued)

FOREIGN PATENT DOCUMENTS

EP    1640047    3/2006
EP    1779909    5/2007
(Continued)

OTHER PUBLICATIONS

International Search Report with Written Opinion mailed Aug. 5, 2014 in Application No. PCT/US2014/023096, 10 pages.
(Continued)

*Primary Examiner* — Michelle Chin
(74) *Attorney, Agent, or Firm* — Micah Goldsmith; Judy Yee; Micky Minhas

(57) ABSTRACT

Embodiments of the present invention provide client-side scene movement using imagery generated by a game server. Embodiments of the present invention predictively render additional imagery surrounding the present field of view. The predictive scene imagery may be on all sides of the current field of view. Embodiments of the present invention determine the amount of predictive scene imagery generated according to a likelihood of use. In addition to client-adjusted rotation, embodiments of the present invention may predictively translate the field of view. Translation is moving the point of view forward, backward or side-to-side. Predictive translation imagery may be communicated to the game server for use in local translation functions.

20 Claims, 13 Drawing Sheets

(51) Int. Cl.
*G06T 1/20* (2006.01)
*A63F 13/30* (2014.01)

(56) References Cited

U.S. PATENT DOCUMENTS

| | | | |
|---|---|---|---|
| 6,377,257 | B1 | 4/2002 | Borrel et al. |
| 6,415,317 | B1 | 7/2002 | Yelon et al. |
| 6,884,172 | B1 | 4/2005 | Lloyd |
| 7,587,520 | B1 | 9/2009 | Kent et al. |
| 7,603,406 | B2 | 10/2009 | Gulliver et al. |
| 7,887,416 | B2 | 2/2011 | Katsume et al. |
| 7,889,669 | B2 | 2/2011 | Abigail |
| 7,971,157 | B2 | 6/2011 | Markovic et al. |
| 8,038,535 | B2 | 10/2011 | Jensen |
| 8,092,307 | B2 | 1/2012 | Kelly |
| 8,151,199 | B2 | 4/2012 | Gerson et al. |
| 8,176,437 | B1 | 5/2012 | Taubman |
| 8,264,493 | B2 | 9/2012 | Peterfreund |
| 8,668,582 | B1 | 3/2014 | Overton |
| 8,888,592 | B1 | 11/2014 | Pereira et al. |
| 8,968,087 | B1 | 3/2015 | Gault et al. |
| 2002/0142843 | A1 | 10/2002 | Roelofs |
| 2004/0003039 | A1 | 1/2004 | Humphrey |
| 2004/0030882 | A1 | 2/2004 | Forman |
| 2004/0082388 | A1 | 4/2004 | Simsek et al. |
| 2004/0135805 | A1 | 7/2004 | Gottsacker et al. |
| 2004/0193813 | A1 | 9/2004 | Nguyen et al. |
| 2006/0135258 | A1 | 6/2006 | Maheshwari et al. |
| 2006/0281511 | A1 | 12/2006 | Holm et al. |
| 2007/0173325 | A1 | 7/2007 | Shaw et al. |
| 2007/0195097 | A1 | 8/2007 | Heesemans |
| 2007/0232396 | A1 | 10/2007 | Yoo |
| 2008/0037534 | A1 | 2/2008 | Shina |
| 2008/0207322 | A1 | 8/2008 | Mizrahi |
| 2009/0094600 | A1 | 4/2009 | Sargaison et al. |
| 2009/0111574 | A1 | 4/2009 | Rowe |
| 2009/0111576 | A1 | 4/2009 | Ostergren et al. |
| 2009/0118019 | A1 | 5/2009 | Perlman et al. |
| 2009/0119729 | A1 | 5/2009 | Periman et al. |
| 2009/0215538 | A1 | 8/2009 | Jew |
| 2009/0247295 | A1 | 10/2009 | Weldon |
| 2010/0197405 | A1 | 8/2010 | Douceur et al. |
| 2010/0229108 | A1 | 9/2010 | Gerson et al. |
| 2010/0304860 | A1 | 12/2010 | Gault et al. |
| 2010/0306813 | A1 | 12/2010 | Perry |
| 2011/0025689 | A1 | 2/2011 | Perez |
| 2011/0055135 | A1 | 3/2011 | Dawson et al. |
| 2011/0086706 | A1 | 4/2011 | Zalewski |
| 2011/0088071 | A1 | 4/2011 | Yerli |
| 2011/0096089 | A1* | 4/2011 | Shenhav ............ G06F 3/04815 345/619 |
| 2011/0145362 | A1 | 6/2011 | Jones et al. |
| 2011/0157196 | A1 | 6/2011 | Nave et al. |
| 2011/0210982 | A1 | 9/2011 | Sylvan et al. |
| 2011/0225040 | A1 | 9/2011 | Yerli |
| 2011/0250949 | A1 | 10/2011 | van Os et al. |
| 2011/0256912 | A1 | 10/2011 | Baynes et al. |
| 2012/0004039 | A1 | 1/2012 | Perry et al. |
| 2012/0004041 | A1 | 1/2012 | Pereira et al. |
| 2012/0004042 | A1 | 1/2012 | Perry |
| 2012/0009997 | A1 | 1/2012 | Youm |
| 2012/0064968 | A1 | 3/2012 | Youm et al. |
| 2012/0064976 | A1 | 3/2012 | Gault et al. |
| 2012/0072911 | A1 | 3/2012 | Whaley |
| 2012/0079095 | A1 | 3/2012 | Evans et al. |
| 2012/0299938 | A1 | 11/2012 | Iwasaki |
| 2013/0046893 | A1 | 2/2013 | Hauser et al. |
| 2013/0225287 | A1 | 8/2013 | Bendayan et al. |
| 2013/0344966 | A1* | 12/2013 | Mustafa ................ A63F 13/12 463/42 |
| 2014/0040970 | A1 | 2/2014 | Alexander et al. |
| 2014/0179421 | A1 | 6/2014 | Quinn et al. |

FOREIGN PATENT DOCUMENTS

| | | |
|---|---|---|
| EP | 2340877 | 7/2011 |
| EP | 2340878 | 7/2011 |
| WO | 9932990 | 7/1999 |
| WO | 0136061 | 5/2001 |
| WO | 2005061068 | 5/2005 |
| WO | 2007119236 | 10/2007 |
| WO | 2012107739 | 8/2012 |
| WO | 2012166305 | 12/2012 |
| WO | 2013006802 | 1/2013 |
| WO | 2013023069 | 2/2013 |

OTHER PUBLICATIONS

Final Office Action dated Jan. 26, 2015 in U.S. Appl. No. 13/723,652, 12 pages.
Non-Final Office Action dated Apr. 10, 2015 in U.S. Appl. No. 13/593,843, 10 pages.
Non-Final Office Action dated Feb. 5, 2014 re U.S. Appl. No. 13/593,843 (33 pages).
PCT App. No. PCT/US2013/051180, International Search Report and Written Opinion, dated Oct. 14, 2013, 13 pages.
Bhuvan Urgaonkar et al. Agile Dynamic Provisioning of Multi-Tier Internet Applications, ACM Transactions on Autonomous and Adaptive Systems, vol. 3, No. 1, Mar. 1, 2008 (Mar. 1, 2008), pp. 1-39, XP055081646.
Machida F et al., Just-In-Time Server Provisioning Using Virtual Machine Standby and Request Prediction, Autonomic Computing, 2008, ICAC, 08, International Conference On, IEEE, Piscataway, NJ USA, Jun. 2, 2008(Jun. 2, 2008), pp. 163-171, XP031276805.
Shaikh A et al., On Demand Platform for Online Games, IBM Systems Jounral, IBM Corp., Armonk, New York, US, vol. 45, No. 1, Jan. 1, 2003, pp. 7-19, XP002492825.
PCT Search Report dated Oct. 31, 2013 re PCT/US2013/055234, 9 pages.
Notification of Transmittal of the International Search Report and the Written Opinion of the International Searching Authority, or the Declaration in PCT/US2013/76871 mailed Mar. 13, 2014, 11 pages.
PCT Search Report dated Mar. 27, 2014 re Appl. No. PCT/US2013/076918 (11 pages).
Final Office Action dated Sep. 29, 2014 in U.S. Appl. No. 13/593,843, 14 pages.
Non-Final Office Action dated Sep. 30, 2014 in U.S. Appl. No. 13/723,498, 12 pages.
Notice of Allowance dated Oct. 20, 2014 in U.S. Appl. No. 13/554,215, 8 pages.
Raghuraman et al "Immersive Multiplayer Tennis With Microsoft Kinect and Body Sensor Network" Published Oct. 29-Nov. 2, 2012, 4 pages.
Dance Central Game Manual released Nov. 4, 2010, 12 pages.
Non-Final Office Action dated Dec. 4, 2014 in U.S. Appl. No. 13/723,652, 11 pages.
Components of a Multiplayer Game, Published on: Jul. 11, 2011, 7 pages, available at: http://www.jenkinssoftware.com/raknel/manual/multiplayergamecomponents.html.
Jurgelionis, et al., "Platform for Distributed 3D Gaming", In International Journal of Computer Games Technology—Special Issue on Cyber Games and Interactive Entertainment, vol. 2009, Article ID 231863, Jan. 2009, 15 pages.
Wang, et al., "Modeling and Characterizing User Experience in a Cloud Server Based Mobile Gaming Approach", In Proceedings of the 28th IEEE Conference on Global Telecommunications, Nov. 30, 2009, pp. 1-7.
Chen, et al., "Measuring The Latency of Cloud Gaming Systems", In Proceedings of the 19th ACM International Conference on Multimedia, Nov. 28, 2011, pp. 1269-1272.
Marzolla, et al., "Dynamic Resource Provisioning for Cloud-based Gaming Infrastructures", In Proceedings of the ACM Computers in Entertainment, vol. 9, No. 4, Article 39, Mar. 2011, 19 pages.
Claypool, et al., "Latency Can Kill: Precision and Deadline in Online Games", In Proceedings of the First Annual ACM SIGMM Conference on Multimedia Systems, Feb. 22, 2010, pp. 215-222.

(56) References Cited

OTHER PUBLICATIONS

Bernier, Yahn W., "Latency Compensating Methods in Client/Server In-game Protocol Design and Optimization", In Proceedings of the 15th Games Developers Conference, Mar. 2001, 13 pages.

Shi, Shu, "Reduce Latency: The Key to Successful Interactive Remote Rendering Systems", In IEEE International Conference on Pervasive Computing and Communications Workshops, Mar. 21, 2011, 2 pages.

Winter, et al., "A Hybrid Thin-Client Protocol for Multimedia Streaming and Interactive Gaming Applications", In 16th International Workshop on Network and Operating Systems Support for Digital Audio and Video, Nov. 22, 2006, 7 pages.

Kunsemoller, et al., ""A Game—Theoretical Approach to the Benefits of Cloud Computing"", Retrieved on: Jan. 30, 2012, Available at: http://www.my-groups.de/gecon2011/publications/Kuensemoeller_GECON2011.pdf.

Day, Nathan, ""Building a True Real-Time Multiplayer Gaming Platform"", Published on: Oct. 11, 2011, Available at: http://blog.softlayer.com/2011/building-a-true-real-time-multiplayer-gaming-platform/.

Leung, et al., "Onlive Cloud Gaming Service", Published on: May 2011, 14 pages, SE 172/272 Enterprise Software, Available at: http://www.sjsu.edu/people/rakesh.ranjan/courses/cmpe272/s1/Team%20WS%20OnLive%20Cloud%20Gaming%20Service.pdf.

Final Office Action dated May 7, 2015 in U.S. Appl. No. 13/723,498, 9 pages.

Kim, et al., "Multi-view Rendering Approach for Cloud-based Gaming Services", In The Third International Conference on Advances in Future Internet, Aug. 21, 2011, pp. 102-107.

"Office Action Issued in European Patent Application No. 13742806.6", Mailed Date: Jun. 24, 2015, 3 Pages.

Non-Final Office Action dated Jul. 30, 2015 in U.S. Appl. No. 13/723,652, 7 pages.

Non-Final Office Action dated Sep. 29, 2015 in U.S. Appl. No. 14/179,154, 14 pages.

Final Office Action dated Oct. 23, 2015 in U.S. Appl. No. 13/593,843, 16 pages.

Non-Final Office Action dated May 30, 2014 in U.S. Appl. No. 13/554,215, 14 pages.

International Search Report with Written Opinion mailed Jul. 31, 2014 in Application No. PCT/US2014/022712, 11 pages.

Non-Final Office Action dated Jun. 30, 2016 in U.S. Appl. No. 14/607,238, 5 pages.

Notice of Allowance dated Aug. 8, 2016 in U.S. Appl. No. 13/723,652, 8 pages.

Final Office Action dated Feb. 12, 2016 in U.S. Appl. No. 14/179,154, 14 pages.

Non-Final Office Action dated Mar. 11, 2016 in U.S. Appl. No. 13/723,498, 8 pages.

Notice of Allowance dated Mar. 14, 2016 in U.S. Appl. No. 13/593,843, 8 pages.

Non-Final Office Action dated Apr. 7, 2016 in U.S. Appl. No. 13/723,652, 8 pages.

\* cited by examiner

CLIENT SIDE PROCESSING OF PLAYER MOVEMENT IN A REMOTE GAMING ENVIRONMENT

CROSS-REFERENCE TO RELATED APPLICATIONS

This application claims the benefit of U.S. Provisional Application No. 61/783,351, filed Mar. 14, 2013, which is herein incorporated by reference.

BACKGROUND

Game servers allow players to connect from different client devices and play together within a multiplayer game. The game servers run game code that is manipulated based on controller input received from the different clients. Game state information is periodically updated and communicated to the individual game clients that render video game images.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide client-side scene movement using imagery generated by a game server. Embodiments of the present invention work in an online gaming environment where the game code is executed at a game server that renders video game imagery that is communicated to a game client. The game client outputs the video game imagery for the user.

Embodiments of the present invention predictively render additional imagery surrounding the present field of view. This additional content is described herein as predictive scene imagery. The predictive scene imagery may be on all sides of the current field of view. However, more scene imagery may be provided on one side or the other based on the likelihood of rapid rotation in that direction. In one embodiment, the client crops the rendered image received from the game client to generate a displayed image that only includes the present field of view. The predictive scene imagery is saved to memory for possible use during rotation.

Embodiments of the present invention determine the amount of predictive scene imagery generated according to a likelihood of use. Embodiments of the present invention attempt to optimize the amount of predictive scene imagery generated by analyzing various factors including game play mechanics within a title, a player's play style, a current network performance, game situations, and feedback from analysis of online game play across multiple game sessions. The goal is to generate enough predictive scene imagery to display between receiving a first rendered image and a second rendered image from the gaming server. In one embodiment, the pixel density, or resolution, within the predictive scene imagery is less than the resolution within the primary scene imagery.

In addition to client-adjusted rotation, embodiments of the present invention may predictively translate the field of view. Translation is moving the point of view forward, backward or side-to-side. For example, in a first player shooter game, as the player walks forward, the field of view is translated forward with the player. In one embodiment, imagery is predictively rendered and communicated in anticipation of translation. Predictive translation imagery may be communicated to the game server for use in local translation functions. For example, a player may be assumed to move in the same direction they are currently moving and scenery could be downloaded in advance in anticipation of use by the game client. In another embodiment, additional imagery is not communicated, but basic geometry of the player's environment is communicated. The existing scene imagery received from the game server is bent or adjusted around the geometry to create intermittent frames before the full image from the game server is received.

BRIEF DESCRIPTION OF THE DRAWINGS

Embodiments of the invention are described in detail below with reference to the attached drawing figures, wherein.

DETAILED DESCRIPTION

Figure 1:
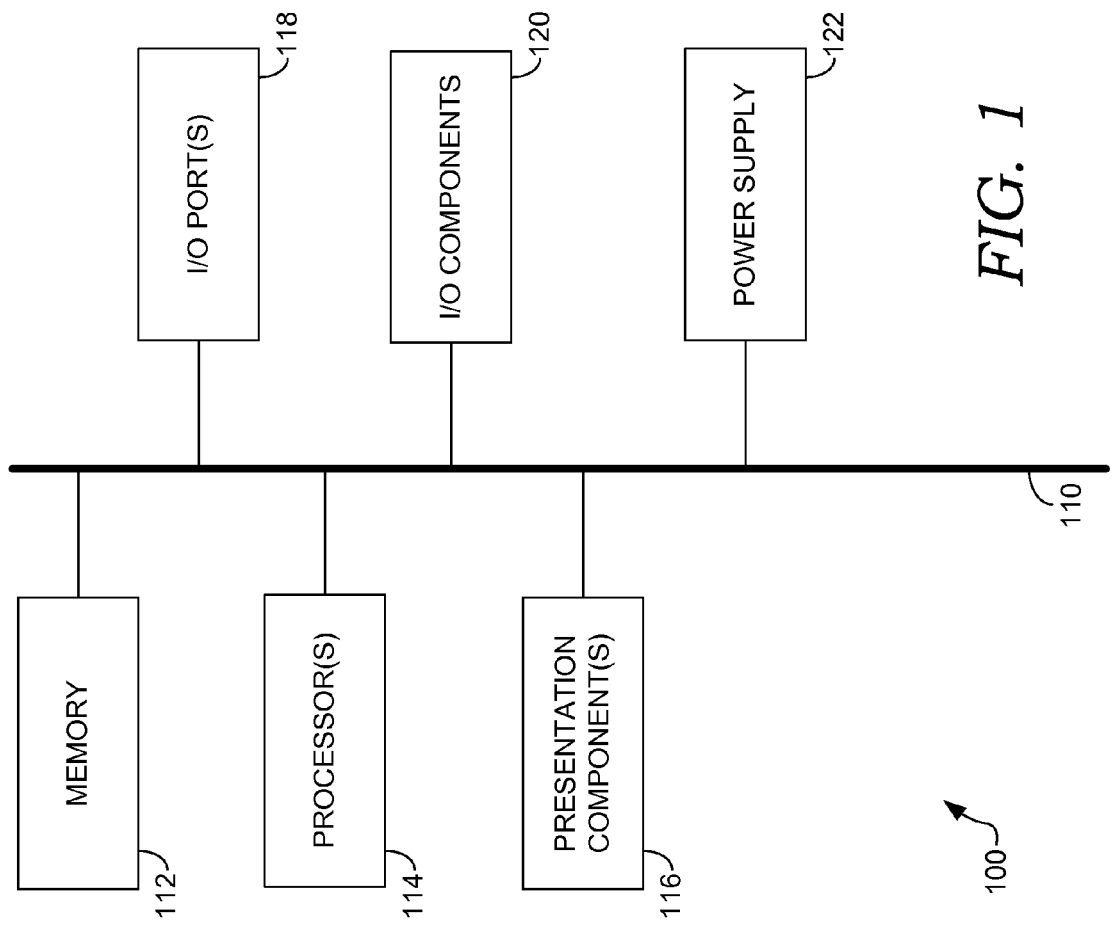
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide client-side scene movement using imagery generated by a game server. Embodiments of the present invention work in an online gaming environment where the game code is executed at a game server that renders video game imagery that is communicated to a game client. The game client outputs the video game imagery for the user. In one embodiment, the client combines the server-generated imagery with imagery generated by the game client to form a single image.

Embodiments of the present invention rotate the game's field of view locally until the next frame, or rendered image, may be received from the game server. The field of view is the bounds of the displayed game world. Games may have a virtual world in which the players' avatars or characters interact. As with the real world, the virtual players have a limited field of view. As the avatar turns its head or changes its perspective, the field of view may expose additional imagery to the right, left, up, or down.

When the rotation is relatively slow, then new imagery may be received from the game server without visible lag. On the other hand, rapid rotation may cause the field of view to rotate more rapidly than new frames may be downloaded from the game server.

Embodiments of the present invention predictively render additional imagery surrounding the present field of view. This additional content is described herein as predictive scene imagery. The scene is the part of the virtual world nearby the character. In other words, the game server renders an image that is larger than the game client needs to display the entire current field of view. The predictive scene imagery may be on all sides of the current field of view. However, more scene imagery may be provided on one side or the other based on the likelihood of rapid rotation in that direction. For example, if an enemy player is approaching from the right, outside of the field of view, then more additional scene imagery may be rendered to the right than to the left as the player is likely to rapidly rotate to the right to attempt to find the enemy player if the enemy player shoots. Similarly, if there is a wall to the right of the player that cannot be passed through, then there may not be a need to predictively render imagery to the right of the player.

In one embodiment, the client crops the rendered image received from the game client to generate a displayed image that only includes the present field of view. The predictive scene imagery is saved memory for possible use during rotation.

Embodiments of the present invention determine the amount of predictive scene imagery generated according to a likelihood of use. Generating large amounts of predictive scene imagery with a low probability of use would waste resources. On the other hand, generating too little predictive scene imagery could degrade the game experience in some circumstances.

Embodiments of the present invention attempt to optimize the amount of predictive scene imagery generated by analyzing various factors including game play mechanics within a title, a player's play style, a current network performance, game situations, and feedback from analysis of online game play across multiple game sessions. The goal is to generate enough predictive scene imagery to display between receiving a first rendered image and a second rendered image from the gaming server. Generally, this is a very small amount of time and may depend on the bandwidth available in the network connection between the server and client.

Thus, as a starting point, the time between receipt of video game images may be determined. The next step is to determine the predicted velocity of the rotation. Using the rotation velocity and the time between images, a calculation can be made of how far the field of view could move during that time. The amount of predictive scene imagery could be based on the distance traveled at the predictive velocity between receipt of video game images from the server.

The predictive velocity may be the maximum rotational velocity allowed within a game title. Different game titles may limit rotation according to the programmed physics of the game. Thus, different game titles may have different ideal sizes of predictive scene imagery.

In another embodiment, the observed maximum rotational velocity may be used. The observed maximum and the theoretical maximum rotation velocity may be different. The observed rotational velocity may be measured for a current player playing the game, or across multiple players. In one embodiment, the player's style of play is observed. Some players are very cautious and tend to move slowly while others thrash about rapidly. The style of play could be used to determine the predictive rotational velocity based on measurement of maximum rotational velocity achieved by players of the same style.

In another embodiment, the observed rotational velocity across multiple instances of the game, including multiple instances in the same situation, are observed to determine the predictive velocity. For example, the rotations made by thousands of players in a similar situation could be determined to calculate the ideal predictive velocity for use in determining the predictive scene imagery. Factors such as the particular place within a game title and actions surrounding the player may be mapped to the present situation to determine a likely predictive velocity.

As mentioned, the network bandwidth or performance may be evaluated on a case-by-case basis. In general, the slower the network connection, the larger the predictive scene imagery needs to be to accommodate delays between receipt of imagery from the game server.

In one embodiment, the pixel density, or resolution, within the predictive scene imagery is less than the resolution within the primary scene imagery. Further, the resolution within the predictive scene imagery may be rendered on a gradient where the resolution decreases as the imagery gets further from the primary scenery. In one embodiment, a probability of use is assigned to sections of the predictive scene imagery. The higher resolutions may be generated for sections with a relatively higher probability of display. Further, the predictive scene imagery is most likely to be shown only during comparatively rapid rotations during which some motion blur would be expected within a game and high resolution imagery is not necessary for a high quality game experience.

In addition to client-adjusted rotation, embodiments of the present invention may predictively translate the field of view. Translation is moving the point of view forward, backward or side-to-side. For example, in a first player shooter game, as the player walks forward, the field of view is translated forward with the player. In one embodiment, imagery is predictively rendered and communicated in anticipation of translation.

Additional scenes may be rendered in anticipation of player movement. A player may be assumed to move in the same direction they are currently moving and scenery could be downloaded in advance in anticipation of use by the game client. For example, a player walking in a particular direction may be assumed to continue walking in that direction and "future" scenes may be communicated in advance for use in rapid translation. In this situation, predictive translation imagery may be communicated to the game server for use in local translation functions. Additional imagery for use in translation operations could be buffered or stored temporarily on the game client and only used if needed.

In another embodiment, additional imagery is not communicated, but basic geometry of the player's environment is communicated. This allows the client to perform contact calculations to prevent a player from running through a wall or into another object. In other words, even as the imagery is yet to be downloaded, the game client could determine that a player can't move in a particular suggested direction due to objects blocking the path. In another embodiment, the existing imagery is bent or adjusted around the geometry to create intermittent frames before the full image from the game server is received.

Embodiments of the present invention may split game processing and rendering between a client and a game server. A rendered video game image is received from a game server and combined with a rendered image generated by the game client to form a single video game image that is presented to a user. Game play may be controlled using a rich sensory input, such as three-dimensional image data generated by a depth camera, or other device capable of generating three-dimensional image data. The three-dimensional image data describes the shape, size, and orientation of objects present in a play environment. The play environment is the area in which players are present and viewed by the input device.

The rich sensory input is communicated to a game server, potentially with some preprocessing, and is also consumed locally on the client, at least in part. In one embodiment, latency-sensitive features are the only features processed on the client and rendered on the client. For example, an avatar that moves in response to user actions captured in the three-dimensional image data may be rendered on the client while the rest of the video game image is rendered on the server. In addition to an avatar, latency-sensitive game features, such as manipulation of real or virtual game objects that move in response to a user's movements, may also be rendered on the client. For example, if an avatar is holding a baseball bat, the baseball bat held by the avatar may also be rendered by the client. Where multiple players are located in view of the control input device, multiple avatars or game features directly linked to the multiple players may be client rendered. In a remote multigame player setting where other players are connected via a network and are not in the same geographic location, then the other players avatars are rendered on the server.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
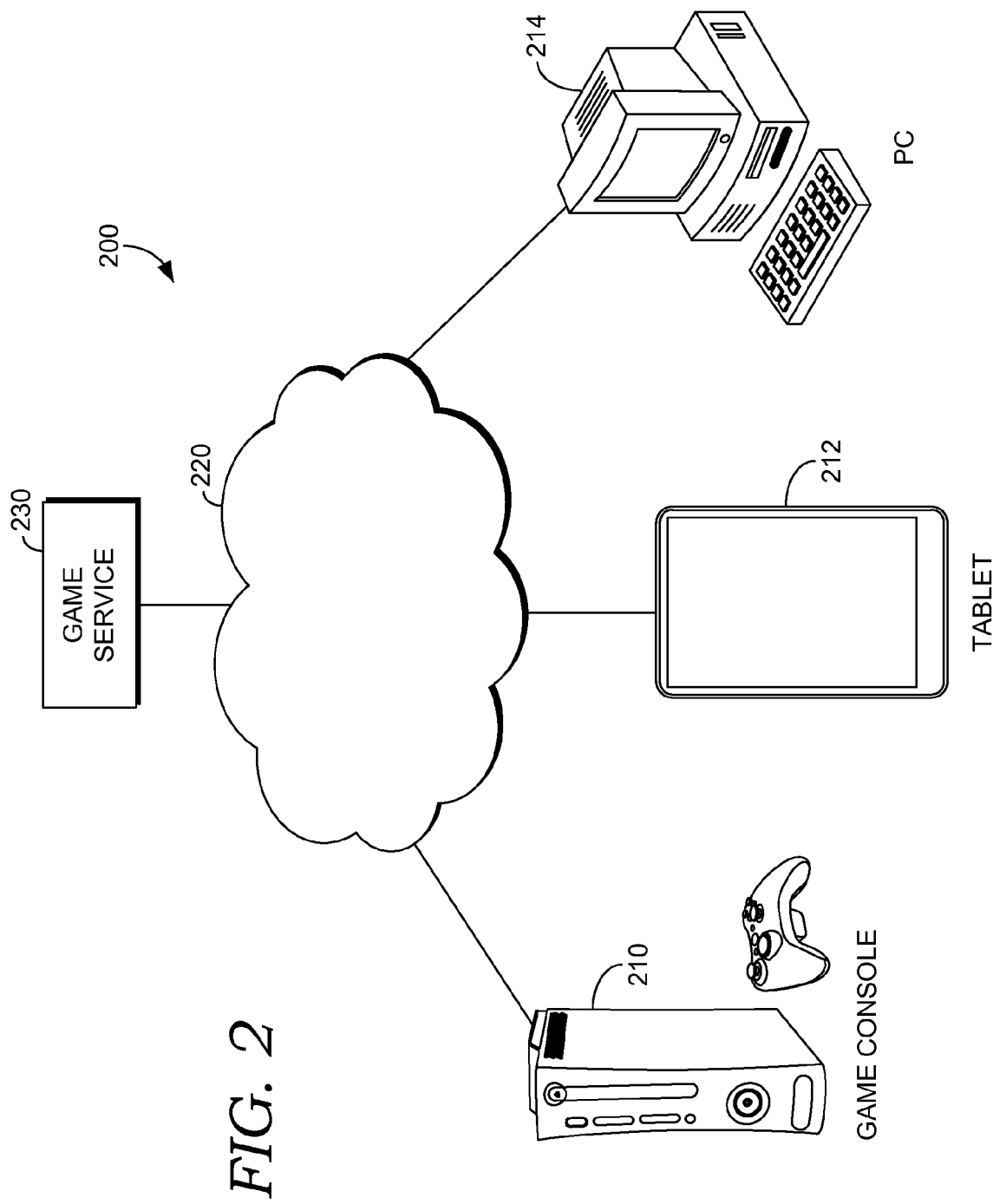
FIG. 2 is a diagram of an online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones and televisions, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

The controllers associated with game console 210 include game pad 231, tablet 232, headset 236, and depth camera 234. A game console may be associated with control devices that generate both a rich data stream and a basic data stream. Individual controllers are capable of generating different kinds of data streams and a single controller could generate both a rich data stream and an basic data stream.

The game pad 231 may be capable of generating basic control signals, such as those generated by button selections and joystick movement. Movement data such as that generated by accelerometers and gyros within the game pad 231 may be examples of rich sensory data. In some implementations, the movement data is not considered a rich sensory data.

The classification of an input stream as rich or basic depends on the latency caused to the game by uploading the full control stream. Factors such as available bandwidth and client capabilities may affect the classification. In one embodiment, a data stream that adds more than 80 ms of roundtrip latency during communication to a game server is classified as rich. Roundtrip latency refers to the total delay between the user providing an input, such as pushing a button, and seeing the result (e.g., avatar movement) of the input on the display. Unless otherwise specified in this disclosure, the term latency refers to roundtrip latency. Thus, the terms latency and roundtrip latency are used interchangeably. The 80 ms of latency is in addition to latency added by baseline processing on the client and server. Different games may establish different latency standards. Further, different game features may have different latency tolerance.

Embodiments of the present invention may make a contextual determination of what constitutes a rich data stream for a particular game, under particular circumstances. Each game may have a roundtrip latency-sensitivity rating. The roundtrip latency-sensitive rating may be determined from user feedback collected from test groups, or through another method, and associated with the game. The latency sensitivity rating may be different for different game features or the same for the entire game. For example, avatar movement may be given a different sensitivity rating than background movement.

The rich or basic classification for each input stream may be determined by identifying the latency sensitivity rating for the present game, determining available bandwidth, and determining client and server processing capabilities. The various factors may be combined to determine latency created for the control stream. If it is less than the latency sensitivity rating then the control stream is basic, if greater than the latency sensitivity rating then rich.

In an embodiment, the latency associated with a control stream is determined experimentally using a test control input and test game response. The measured latency is used to determine whether the control is basic or rich.

When the control is determined to be rich via experimentation or calculation, then client-side preprocessing of the control stream may be used. Various preprocessing methods are described in more detail subsequently. If the control is basic, then it is uploaded without being transformed to a reduced control input, but it may still be processed according to various transport protocols and other processing involved in communicating the control signal to the server. This other processing occurs to both pre-processed and unprocessed control signals.

When certain features are latency sensitive, then those features may be rendered on the client and combined with rendered images received from the server. A feature may be latency sensitive regardless of the control input. For example, avatar movement may be latency sensitive regardless of the whether the avatar is controlled using a depth camera or joystick.

The tablet 232 can be both a game controller and a game client. Tablet 232 is shown coupled directly to the game console 210, but the connection could be indirect through the Internet or a subnet. In one embodiment, the game service 230 helps make a connection between the tablet 232 and the game console. The game service 230 may associate devices when the devices log in using the same identification or identification codes that are linked. Users may also ask that devices be linked through the game service 230 for use as input or companion devices. The tablet 232 is capable of generating numerous control streams and may also serve as a display output mechanism. In addition to being a primary display, the tablet 232 could provide supplemental game information different from, but related to information shown on a primary display coupled to the game console 210, or simply be a control surface. The input streams generated by the tablet 232 include video and picture data, audio data, movement data, touch screen data, and keyboard input data.

The depth camera 234 generates three-dimensional image data used as a control input. The depth camera 234 may use infrared camera to determine a depth, or distance from the camera for each pixel captured. Stereoscopic depth cameras are also possible. In addition, the depth camera 234 may capture a color video stream or picture. The depth camera 234 may have several image gathering components. For example, the depth camera 234 may have multiple cameras. The depth camera 234 may be used to create user interface though which the user makes gestures and speaks audio commands to control game. The user may have no other controller. In other embodiments, the depth camera 234 may be used in combination with other control input.

The headset 236, captures audio input from a player and the player's surroundings and may also act as an output device if it is coupled with a headphone or other speaker.

The game service 230 allows the game to be executed within the computing devices provided by the game service 230. A communication session between the game service and game clients carries input traffic to the game service 230 and returns a rendered game image. In this embodiment, a computing device that is part of the game service executes the video game code using a control stream generated by input devices associated with the various game clients. The rendered video game is then communicated over the network to the game client where the rendered game is output for display.

Game service 230 may comprise multiple computing devices communicatively coupled to each other. In one embodiment, the game service 230 is implemented using one or more server farms. The server farms may be spread out across various geographic regions including cities throughout the world. In this scenario, the game clients may connect to the closest server farms. Embodiments of the present invention are not limited to this setup.

Exemplary Game Client and Game Service for Remote Gaming

Figure 3:
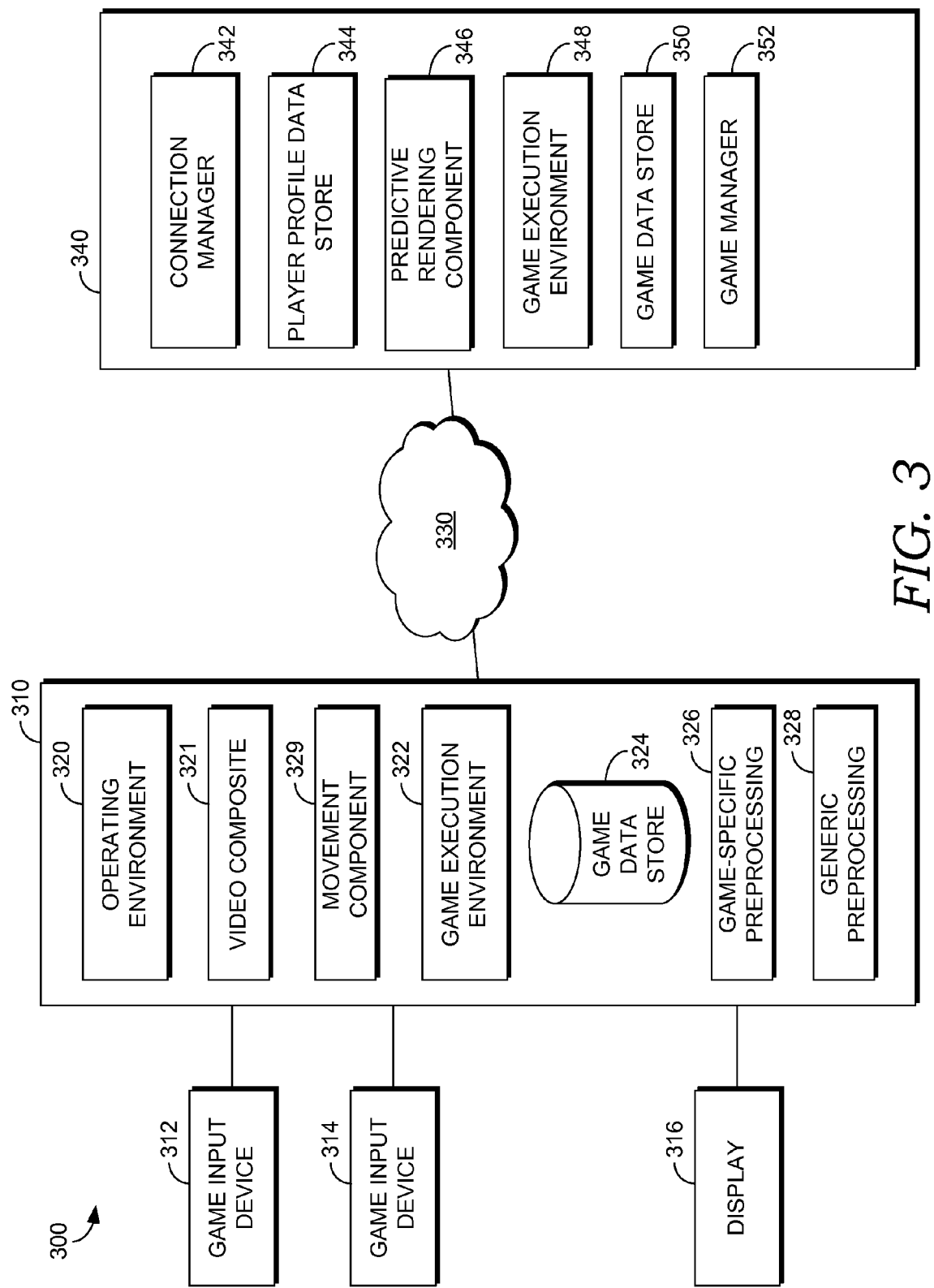
FIG. 3 is a diagram of a remote gaming computing environment, in accordance with an embodiment of the present invention.

Turning now to FIG. 3, a remote gaming environment 300 for rendering predictive scene imagery for use in client-side movement is shown, in accordance with an embodiment of the present invention. The gaming environment 300 includes a game client 310 communicatively coupled to a game server 340 through a network 330. In one embodiment, the network may be the Internet. The game client 310 is connected to a first game input device 312, a second game input device 314, and a display 316. Exemplary game input devices include game pads, keyboards, a mouse, a touch pad, a touch screen, movement aware devices (e.g., accelerometer and/or gyroscope equipped devices), a microphone for receiving voice commands, a depth camera, a video camera, and a trackball. Embodiments of the present invention are not limited to these input devices. The display 316 is capable of displaying video game content. For example, the display 316 may be a television or computer screen. In another embodiment, the display 316 is a touch screen integrated with the game client 310.

The game client 310 is a computing device that is able to execute video games. The game client 310 could be a tablet or a laptop computer. In another embodiment, the game client 310 is a game console and the display 316 is a remote display communicatively coupled to the game console. The game client 310 includes an operating environment 320, a video composite component 321, a game execution environment 322, a game data store 324, a game-specific preprocessing component 326, a generic pre-processing component 328, and a movement component 329.

The operating environment 320 may be provided by an operating system that manages the hardware and provides services to application running on the game client 310. The operating environment may allocate client resources to different applications as part of the pre-processing and other functions.

The game data store 324 stores downloaded games and partially downloaded games. Games may be downloaded in playable blocks. To play a game, the game may need to be loaded from the game data store 324 into active memory associated with the game execution environment 322. The game data store 324 may also store player progress files.

The game-specific preprocessing component 326 processes a rich controller input to generate a reduced controller input. The reduced controller input can take many forms and can vary depending on the type of rich controller input involved.

When the rich control input is three-dimensional image data, the reduced controller input generated by the client may take the form of skeletal tracking data, a reduction to surfaces, a reduction to geometry, deltas, compressed imagery, and a reduction to bounding boxes. Each of these will be described in more detail subsequently, but they all result in control data comprising less data to communicate to the controller. The reduced controller input is communicated over network 330 to the game execution environment 348 on the game server 340. The reduced controller input is used as an input that controls the game in progress.

The game-specific preprocessing component 326 is specific to the particular game being executed. While the steps may be similar to the generic preprocessing described subsequently, a part of the game-specific processing is specific to a particular game. The code may be game specific to generate an output in a form that is consumable to the particular game. In other words, game specific code may be used to generate a compatible control signal. In other cases, the game specific code does something unique that other games do not do.

In one embodiment, the game-specific preprocessing generates a control input that is specific to the game. For example, a hand gesture could be interpreted to mean move the avatar right or to pick up an object in a first game, but something different in a second game. In this case, the reduced controller input would simply be a movement command instead of the three-dimensional image data. Interpreting three-dimensional image data to recognize a gesture and form a movement command is a transformation of one type of input data (depth data) to a second type (movement). Taking this one-step further, the movement data or depth data could be converted to a control command, such as "throw ball" or "pause game." This is described as transformation to control. In other embodiments, relevant control data is separated from irrelevant control data, but does not change form. For example, reduced controller input could be a portion of the three-dimensional image around an object of interest, such as a player's face or hand, without the rest of the three-dimensional image data. Isolating a portion of image data (3D or 2D) is described as a reduction to a bounding box. In the game-specific preprocessing of audio commands, the reduced controller input could be a unique game command or a common game command described in a game specific way, such as use of game specific slang.

In one embodiment, the game-specific preprocessing component 326 is extracted or based on a video game originally written to be processed entirely on the client side. In this manner, the part of the video game that processes the rich controller inputs is separated and put on the client side and the commands for other game functions are sent up to the execution part of the game, which resides on the game server 340. In this case, there may be a need to reconcile data that would have otherwise been processed instantaneously within the game execution environment on a client. The signal reconciliation component 346, explained in more detail subsequently, may perform this reconciliation.

The generic preprocessing component 328 preprocesses the rich data input in a way that is applicable to or consumable by multiple games. The reduced controller input generated by the generic preprocessing component 328 is communicated over network 330 to the game execution environment 348 where it may be used to manipulate the game in progress. The examples of generic preprocessing steps include skeletal tracking, deltas, reduction to services, reduction to geometry, reduction to bounding boxes, and three-dimensional image compression. When the rich data input includes audio signals the generic processing could be a speech-to-text translation. For example, the user could speak the word "pause" and the generic preprocessing could send a command to pause the game.

The game execution environment 322 comprises the gaming resources on the client 310 uses to execute instances of a game or part of a game. In some embodiments, the client 310 does not include a game execution embodiment or the computing resources to execute the full game. The game execution environment 322 comprises active memory along with computing and video processing. The game execution environment 322 receives gaming controls and causes the game to be manipulated and progressed according to its programming. In one embodiment, the game execution environment 322 outputs a rendered video stream that is communicated to a display device.

In other embodiments, the game execution environment 322 includes code related to character interactions. In one embodiment, only latency-sensitive character interaction game features are rendered on the client. Latency-sensitive features of a game may be designated by a game developer and may also be dynamically determined In one embodiment, the game server 340 communicates game code needed to execute only the latency-sensitive interaction features. The execution environment 322 may not have resources or the code to execute the entire game. The game execution environment 322 may execute part of a game to generate game images that are combined by the video composite component 321 with rendered images received from the game server 340.

Game interactions, and latency-sensitive game interactions, may take multiple forms including targeting, delivery, and contact. In all forms of interaction, a character may be the subject or object of the interaction or a combination of both. For example, a character could throw balls at other characters and be hit by balls thrown by others. Different games use different onscreen manifestations for targeting, delivery, and contact. In some games, a manifestation may be displayed indicating the character is being targeted by others. This manifestation may be client rendered as part of a character interaction with a game object, even though the character is the object of the interaction rather than the performer.

Targeting interactions involve a first character targeting a game object, such as a second character or ball. As used throughout, the first character is the character controlled by a user associated with the client device on which the first character's interactions are processed and rendered. In racing games, steering may be an example targeting and client rendered. For example, a car or part of a car may be rendered by the client and move according to steering commands. In a first person racing game where the car is not visible, the immediate foreground in front of the car may be client rendered in response to the steering input. Targeting may be a preliminary step, but it is not required in all games.

In addition to targeting, game interactions include delivery of the game object that has been targeted. For example, a bullet being fired from a gun or a ball being kicked are both examples of an delivery interaction. In the shooting example, the muzzle flash, audible sounds associated with firing, and a tracer or other indication of bullet trajectory may be rendered on the client and combined with images rendered by a server to depict the delivery interaction.

A third class of game interaction is contact detection. Broadly, contact detection indicates whether a game object contacted an intended target or any target. For example, if a character was shooting at another character, the contact detection would indicate that the character hit the intended target. Manifestations of the hit may be rendered on the client device.

Other types of game interactions may be rendered on the client device and combined with video game images rendered by the server to produce a video game experience for a user. In one embodiment, a character's interaction with game objects are the only features processed on the client and rendered on the client. In a remote multiplayer setting where other players are connected via a network and are not in the same geographic location or play space, then the other character's images are rendered on the server.

The video composite component 321 merges rendered video game images received from the game server 340 with rendered video game images rendered by the client 310 to form a single image that is output to display 316. The video composite component may perform scaling and other functions to generate a video output that is appropriate.

The movement component 329 generates video frames depicting movement using rendered content generated by the predictive rendering component 346. The movement component 329 may crop out predictive scene imagery leaving only primary scene imagery. The cropping may be performed using extents of the primary scene imagery provided by the predictive rendering component 346. Upon receiving instructions to rotate the field of view, the movement component 329 generates a new frame using the predictive scene imagery.

In addition to client-adjusted rotation, the movement component 329 may predictively translate the field of view. Translation is moving the point of view forward, backward or side-to-side. For example, in a first player shooter game, as the player walks forward, the field of view is translated forward with the player. In one embodiment, imagery is predictively rendered by the predictive rendering component 346 and communicated in anticipation of translation.

Additional scenes may be rendered in anticipation of player movement. A player may be assumed to move in the same direction he is currently moving and scenery could be downloaded in advance in anticipation of use by the game client. For example, a player walking in a particular direction may be assumed to continue walking in that direction and "future" scenes may be communicated in advance for use in rapid translation. In this situation, predictive translation imagery may be communicated to the game server for use in local translation functions. Additional imagery for use in translation operations could be buffered or stored temporarily on the game client and only used if needed.

In another embodiment, additional imagery is not communicated, but basic geometry of the player's environment is communicated. This allows the movement component 329 to perform contact calculations to prevent a player running through a wall or into another object. In other words, even as the imagery is yet to be downloaded, the game client could determine that a player can't move in a particular suggested direction due to objects blocking the path. In another embodiment, the existing imagery is bent or adjusted around the geometry to create intermittent frames before the full image from the game server is received.

The game server 340 comprises a connection manager 342, a player profile data store 344, a predictive rendering component 346, a game execution environment 348, a game data store 350, and a game manager 352. Though depicted as a single box, the game server 340 could be a server farm that comprises numerous machines, or even several server farms.

The connection manager 342 builds a connection between the client 310 and the game server 340. The connection manager 342 may also provide various authentication mechanisms to make sure that the user is authorized to access the game service provided by the game server 340. The connection manager 342 may also analyze the bandwidth available within a connection and provide this information to components as needed. For example, the resolution of the video game image may be reduced to accommodate limited bandwidth.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. As a player progresses through a game, the player's score and access to game levels may be stored. Further, the player profile data store 344 may store information about individual player preferences such as language preferences. Information regarding a player's game client and speed of the network connection may also be stored and utilized to optimize the gaming experience. For example, in one embodiment, when a geographically proximate server farm is busy, players with higher latency Internet connections may be preferentially connected to proximate server farms while players with lower latency connections may be connected to server farms that are further away. In this way, the players with the network connections that are best able to handle the additional latency are connected to server farms that create additional latency because of their location.

The player profile data store 344 may also store a usage history for the individual player. A player's history of purchasing games, sampling games, or playing games through a game service that does not require the purchase of the games may be stored. The usage information may be analyzed to suggest games of interest to an individual player. In one embodiment, the purchase history may include games that are not purchased through the game service. For example, the purchase history may be augmented by the player entering in a key from a game purchased in a retail store. In some embodiments, the player may then have access to that game both on their game client 310 and through the game service.

The game execution environment 348 comprises the gaming resources on the game server 340 uses to execute instances of a game or part of a game. The game execution environment 348 comprises active memory along with computing and video processing. The game execution environment 348 receives control signals from the game client 310 and causes the game to be manipulated and progress according to its programming In one embodiment, the game execution environment 348 outputs a rendered video stream that is communicated to the game client. In other embodiments, the game execution environment 322 outputs game geometry, depth buffer data, or other representations, which may be combined with local objects on the gaming client to render the gaming video. The game execution environment 322 may execute part of a game to generate game images that are communicated to the game client 310 for combination with rendered images generated by the game client 310.

The predictive rendering component 346 determines the parameters of predictive scene imagery. Embodiments of the present invention predictively render additional imagery surrounding the present field of view. This additional content is described herein as predictive scene imagery. The scene is the part of the virtual world nearby the character. In other words, the game server renders an image that is larger than the game client needs to display the entire current field of view. The predictive scene imagery may be on all sides of the current field of view. However, more scene imagery may be provided on one side or the other based on the likelihood of rapid rotation in that direction. For example, if an enemy player is approaching from the right, outside of the field of view, then additional scene imagery may be rendered more to the right than to the left as the player is likely to rapidly rotate to the right to attempt to find the enemy player if the enemy player shoots. Similarly, if there is a wall to the right of the player that cannot be passed through, then there may not be a need to predictively render imagery to the right of the player.

The predictive rendering component 346 determines the amount of predictive scene imagery generated according to a likelihood of use. Generating large amounts of predictive scene imagery with a low probability of use would waste resources. On the other hand, generating too little predictive scene imagery could degrade the game experience in some circumstances.

The predictive rendering component 346 attempts to optimize the amount of predictive scene imagery generated by analyzing various factors including game play mechanics within a title, a player's play style, a current network performance, game situations, and feedback from analysis of online game play across multiple game sessions. The goal is to generate enough predictive scene imagery to display between receiving a first rendered image and a second rendered image from the gaming server. Generally, this is a very small amount of time and may depend on the bandwidth available in the network connection between the server and client.

Thus, as a starting point, the time between receipt of video game images may be determined. The next step is to determine the predicted velocity of the rotation. Using the rotation velocity and the time between images, a calculation can be made of how far the field of view could move during that time. The amount of predictive scene imagery could be based on the distance traveled at the predictive velocity between receipt of video game images from the server.

The predictive velocity may be the maximum rotational velocity allowed within a game title. Different game titles may limit rotation according to the programmed physics of the game. Thus, different game titles may have different ideal sizes of predictive scene imagery.

In another embodiment, the observed maximum rotational velocity may be used. The observed maximum and the theoretical maximum rotation velocity may be different. The observed rotational velocity may be measured for a current player playing the game, or across multiple players. In one embodiment, the player's style of play is observed. Some players are very cautious and tend to move slowly while others thrash about rapidly. The style of play could be used to determine the predictive rotational velocity based on measurement of maximum rotational velocity achieved by players of the same style.

In another embodiment, the observed rotational velocity across multiple instances of the game, including multiple instances in the same situation, are observed to determine the predictive velocity. For example, the rotations made by thousands of players in a similar situation could be determined to calculate the ideal predictive velocity for use in determining the predictive scene imagery. Factors such as the particular place within a game title and actions surrounding the player may be mapped to the present situation to determine a likely predictive velocity.

As mentioned, the network bandwidth or performance may be evaluated on a case-by-case basis. In general, the slower the network connection, the larger the predictive scene imagery needs to be to accommodate delays between receipt of imagery from the game server.

In one embodiment, the pixel density, or resolution, within the predictive scene imagery is less than the resolution within the primary scene imagery. Further, the resolution within the predictive scene imagery may be rendered on a gradient where the resolution decreases as the imagery gets further from the primary scenery. In one embodiment, a probability of use is assigned to sections of the predictive scene imagery. The higher resolutions may be generated for sections with a relatively higher probability of display. Further, the predictive scene imagery is most likely to be shown only during comparatively rapid rotations during which some motion blur would be expected within a game and high resolution imagery is not necessary for a high quality game experience.

Figure 4:
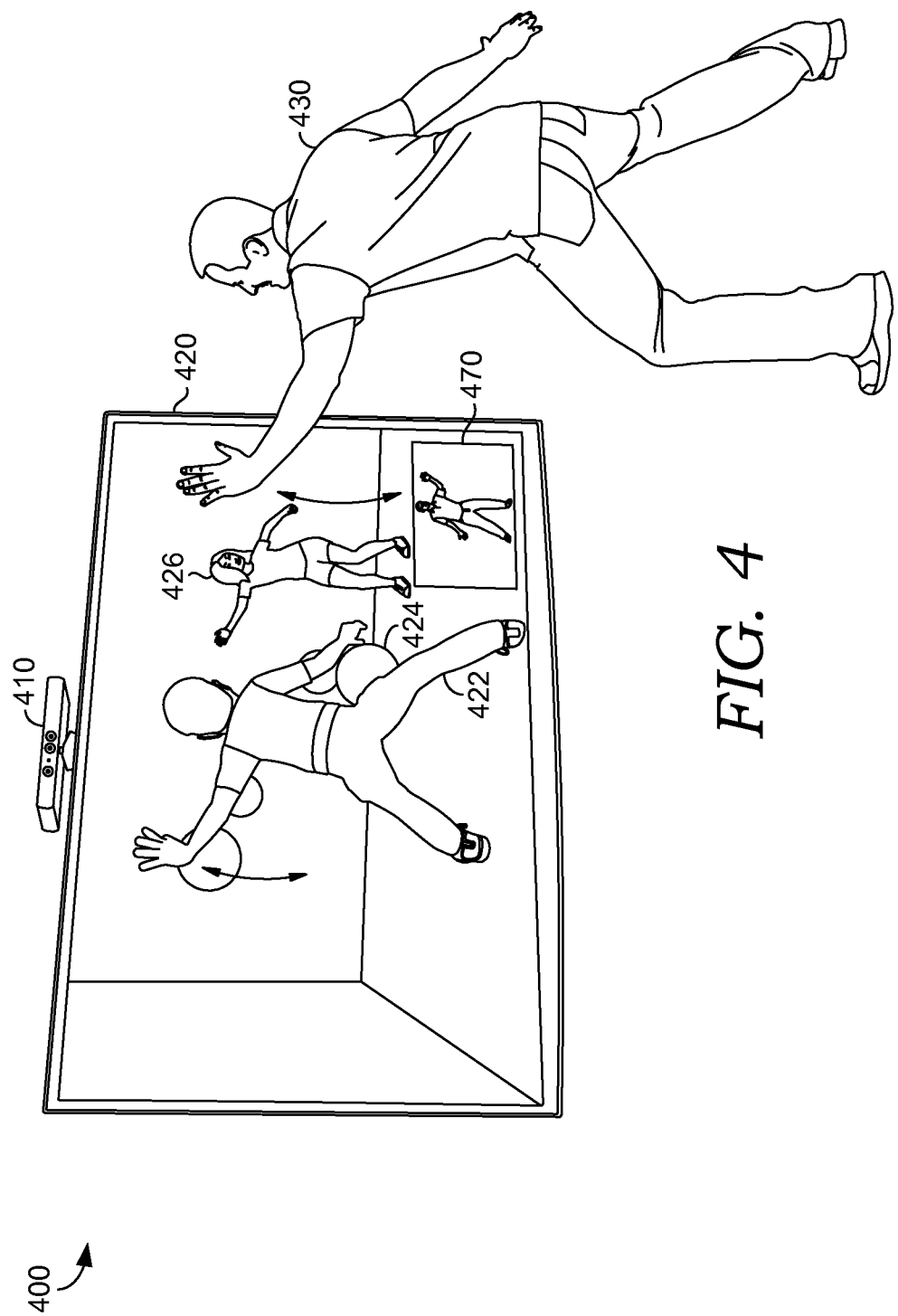
FIG. 4 is a diagram of a gaming interface, in accordance with an embodiment of the present invention.

Turning now to FIG. 4, an exemplary interface is shown, in accordance with an embodiment of the present invention. The depth camera 410 has a view of the player 430. Embodiments of the present invention are not limited to games using a depth camera as a game controller. A depth camera 410 generates three-dimensional image data that is able to capture the player's 430 movement. In this case, the player 430 is moving their left arm up and down. A game console or game server receives the input from the depth camera 410 and uses it to manipulate the avatar 422 shown on display 420. As can be seen, the movements of the avatar 422 interact with virtual objects 424 and a second player 426. A different person connected to the same game session through the game server may control the second player 426. The virtual objects 424 are balls. The user's movements are able to form a control input when captured by the depth camera 410.

FIG. 4 also includes a picture-in-picture ("PIP") image 470 of the player 430. This may be a standard video image captured by the depth camera 410 or some other camera. The PIP image may be rendered on the client without sending the image to the game server because PIP may be latency sensitive.

Figure 5:
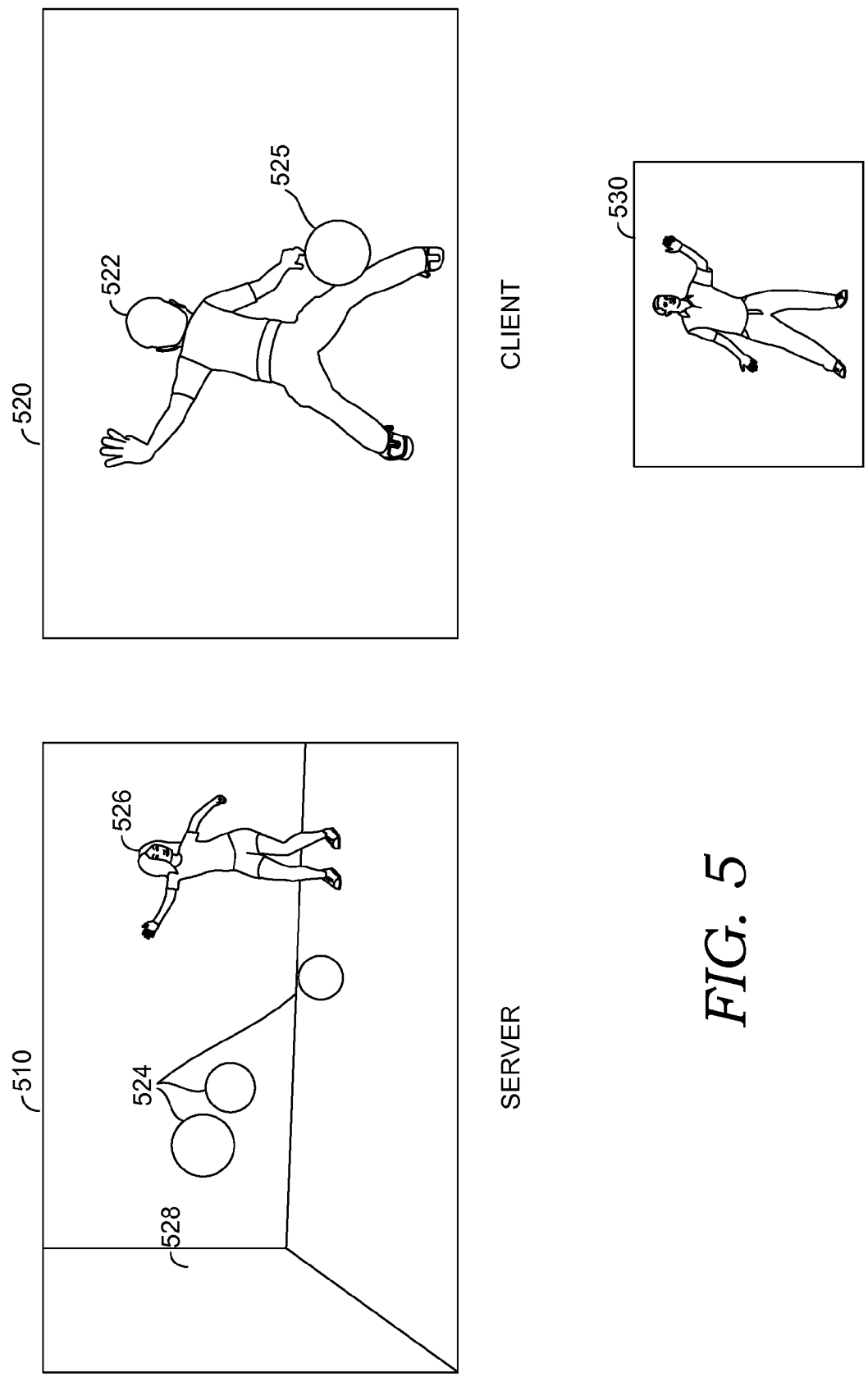
FIG. 5 is diagram illustrating compositing three rendered images, in accordance with an embodiment of the present invention.

Turning now to FIG. 5, three rendered images are illustrated, in accordance with an embodiment of the present invention. The rendered images include server-rendered image 510, client-rendered avatar 520, and client-rendered picture-in-picture 530. These three rendered images are composited to form the image shown previously in FIG. 4. The rendered images generated by the server may also be sent with depth buffer data in addition to colored image data. The depth buffer data is used to order the client-rendered images and the server-rendered images during the composite process. For example, the client may render an avatar that is partially obscured by an object rendered by a server when the images are composited. The depth data is used to composite the images in the correct depth order. The server-rendered image 510 includes both foreground and background images that are not part of player interactions with game objects in the illustrated game. The server-rendered image 510 includes the background area 528, virtual game objects 524, and remote player avatar 526. Virtual game objects 524 are manipulated based on actions taken by the player locally and the second player remotely. As mentioned previously, both players are participating in the same game using different input devices and different game clients. The game is being executed in a remote server's game execution environment.

The avatar 522 is rendered by the client along with ball 525. The ball 525 is rendered by the client because it is being delivered in response to an interaction with avatar 522. The avatar 522 is client rendered because its movements directly affect interactions with the game objects, such as the ball 525. In this illustration, the other virtual objects 524 are server rendered because their movement is not the immediate result of an interaction with the avatar 522.

The avatar 522, ball 525, and the virtual objects 524 are all manipulated as a result of control input received at the client. At least part of the control input is sent to the server and at least part of the control input is consumed by the client. In one embodiment, the entire control input is sent to the server and the entire control input is consumed by the client, but only to execute and render designated game features.

The picture-in-picture 530 is also rendered by the client. In one embodiment, the video image is not communicated to the server along with the other controller input. If the video image is communicated to the server, it is also consumed by the client to generate the PIP image. As mentioned, the three rendered images are composited to form a single video game image that is output to the user.

Figure 6:
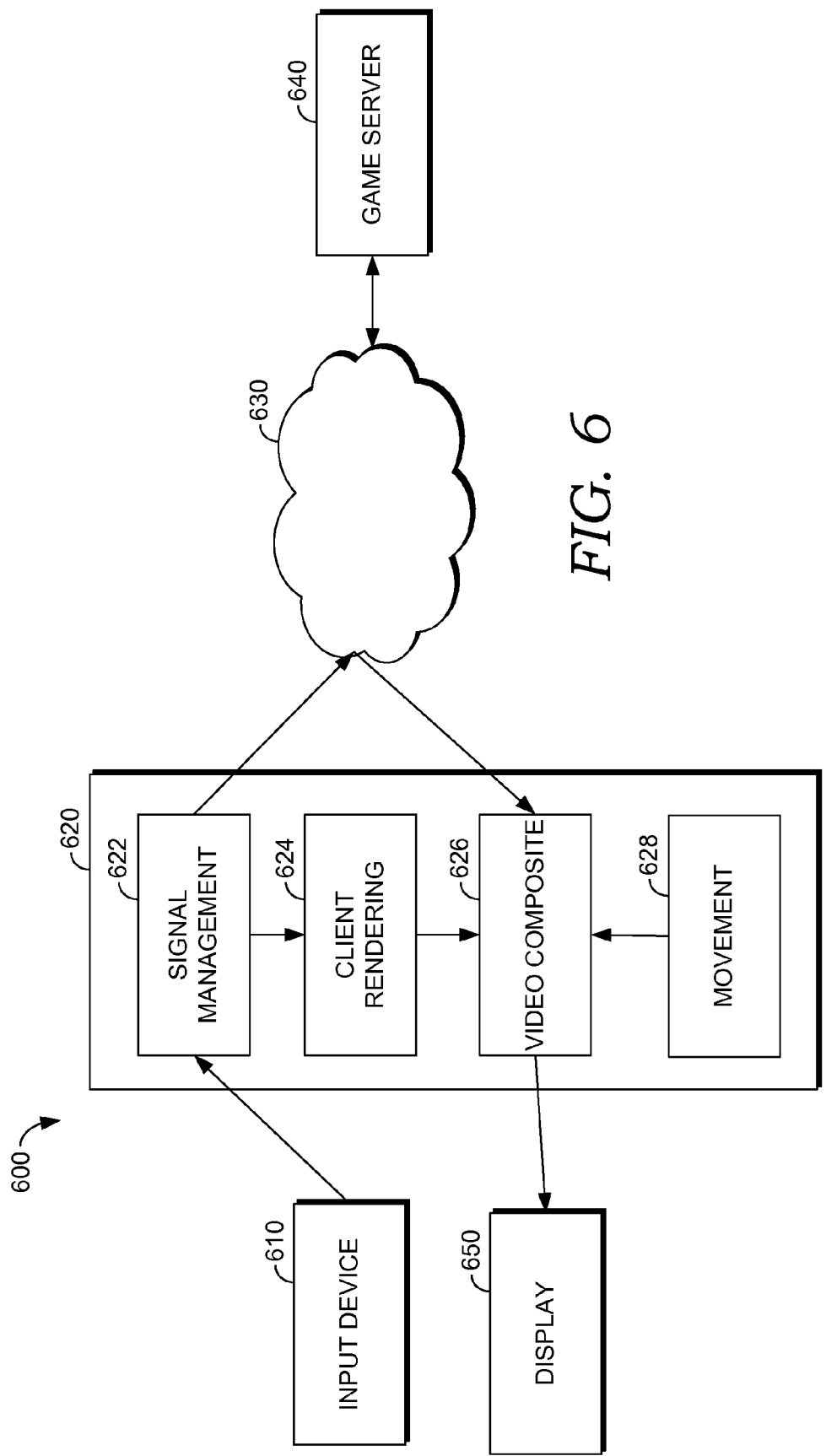
FIG. 6 is a diagram illustrating data flow through a split rendering process, in accordance with an embodiment of the present invention.

Turning now to FIG. 6, data flow through a possible embodiment of the present invention is illustrated. The remote gaming environment 600 includes an input device 610, a game client 620, a network 630, a game server 640, and a display 650. The input device 610 generates a rich data signal, such as a three-dimensional image or video data. Other examples of rich data streams have been described previously. The game client 620 may be a game console or other computing device. Network 630 may be similar to network 330 described previously and may include the Internet. Game server 640 may be similar to game server 340 described previously. Game server 640 executes a video game that has been manipulated in response to control signals received from the game client 620.

The display 650 may be a television, monitor, or other display integrated into a computing device such as a slate or smart phone. In embodiments of the invention, the display 650 may be integrated into the game client 620. For example, the game client 620 may be a slate or laptop computer that has an integrated display. The input device 610 may also be integrated into the game client 620 in some embodiments of the present invention. For example, a game client could have a depth camera integrated into the body of the game client 620.

Initially, the input device 610 generates a control signal that is sent to a signal management component 622 on the game client 620. The control signal may be generated by a game pad, depth camera, or other game controller. The signal management component 622 directs all, or portions, of the control signal to the appropriate destinations. The signal management component 622 may also perform various preprocessing on the data signal to prepare it for consumption by the client rendering component 624 or the game server 640.

The signal management component 622 sends at least part of the signal, preprocessed or otherwise, through network 630 to the game server 640. The game server 640 consumes the signal to manipulate an ongoing game session and to render a video game image. Roughly simultaneously, the signal management component 622 communicates at least part of the control signal to the client rendering component 624 and/or the movement component 628. For the sake of simplicity, the client rendering component 624 is indicated as a single component. However, a the client rendering component 624 may be part of a game execution environment or be related to other components not shown that execute part of the game in response to the signal and determine what image to render.

The client-rendering component 624 generates a client-rendered video game image that is different than the server-rendered video game image generated based on the same or similar signals. Generally, the client rendering component 624 generates images of a particular game feature related to a player's interactions with a game object. In order to render the image, at least part of the video game may be executable on the game client 620. Further, the client may need environmental geometry describing the current scenery around a character in order to calculate appropriate movements. For example, the game client 620 would need to know the character is standing in front of a wall, and not move the character forward in response to a move forward instruction. The character may similarly navigate around objects, fall, leap, or perform other actions depending on environmental conditions. The code on the game client 620 is able to determine player movements that are appropriate for the environmental conditions, including other player locations and game factors, such as player power level. For example, an instruction to jump would not be followed by the client if the present game state indicated the player lacked the present ability to jump.

The game server 640 may periodically send game state information to the game client 620 for use in the client-side game code. The game state information may include environmental geometry describing land, objects, and other players. In one embodiment, the client does not track the overall game progress, game points, scores, etc. For example, the game client 620 may render a game character moving the left arm to hit a ball, but not be aware whether the resulting ball movement scored a point. The client may ultimately output a composite image showing the arm hitting the ball, but the game code may not know other game information beyond what is needed to render the character's changes, or other features related to the interaction.

The rendered video game image from the game server 640 and the client rendering component 624 are both received by the video composite component 626. The rendered video game image includes both primary scene imagery and predictive scene imagery. The video composite component forms a single video game image that is output to the display 650. The composite component may use depth buffer information received from the game server to generate the composite image.

The movement component 628 may crop out predictive scene imagery leaving only primary scene imagery. The cropping may be performed using extents of the primary scene imagery provided by the game server 640. The cropped image may be sent to the video composite component 626. Upon receiving instructions to rotate the field of view, the movement component 628 generates a new frame using the predictive scene imagery. In addition to client-adjusted rotation, the movement component 628 may predictively translate the field of view.

Figure 7:
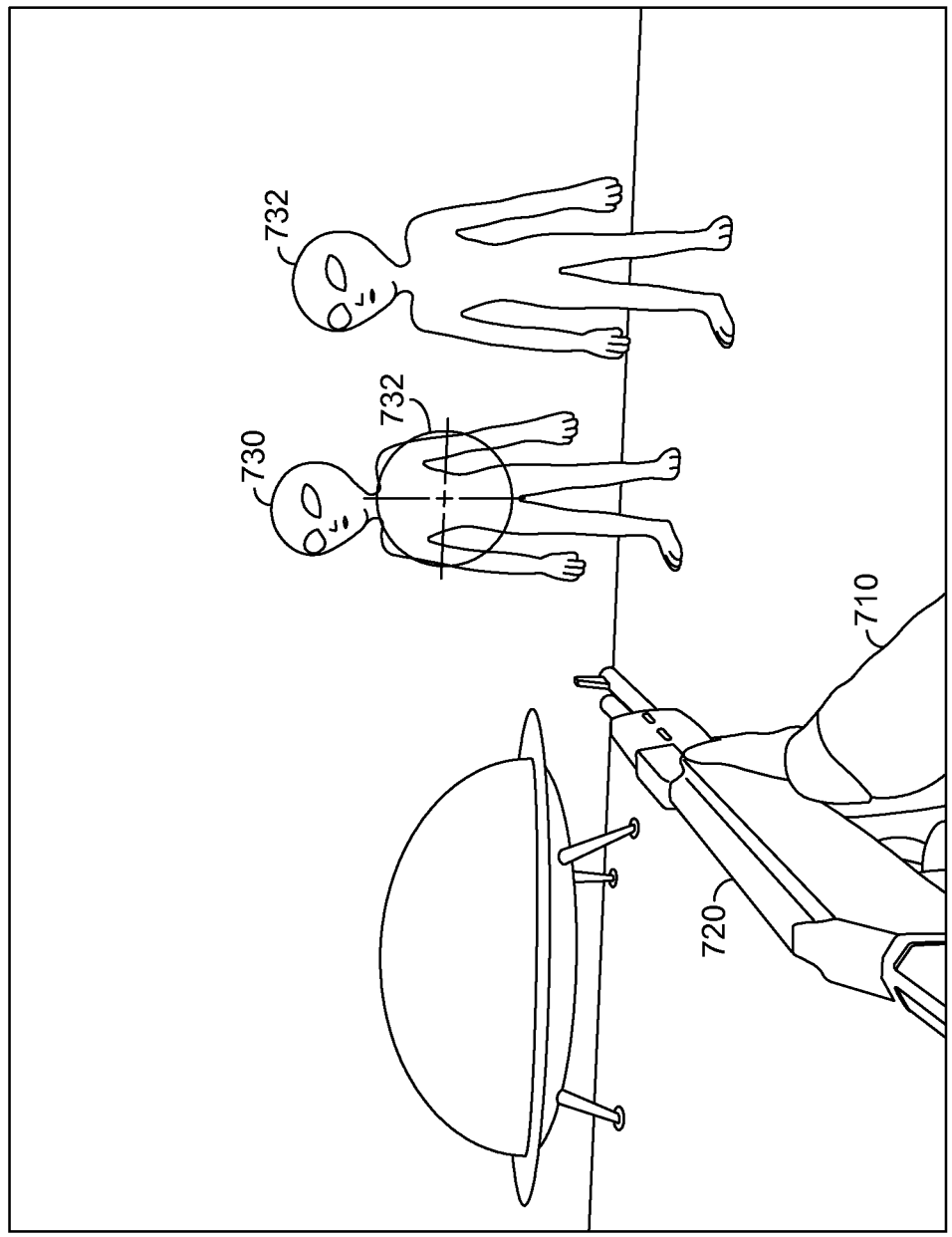
FIG. 7 is a diagram illustrating game interactions in a first-person shooter environment, in accordance with an embodiment of the present invention.

Turning now to FIG. 7, targeting within a first person shooter game is illustrated, in accordance with an embodiment of the present invention. As mentioned, targeting is one form of game interaction that may be rendered on a client device and combined with video game images rendered on a server to form a composited video game image. In this case, the scene 700 depicts a character's arm 710 holding a rifle 720. As indicated by the reticle 734, the rifle is pointed at the alien 730. A nearby alien 732 looks on.

In the example shown, the character's arm 710, the rifle 720, and the reticle 734 could all be part of the character's targeting interaction with the game object. In this case, the game object is the alien 730. In one embodiment, all game features related to the targeting are rendered on the client and combined with the spaceship 736, aliens 730, 732, and all other scene images not related to the character's targeting interactions generated by a game server.

In one embodiment, depicting game interaction manifestations may require that the client understand the arrangement of objects within the scene 700. For example, an object that is targeted may turn red or otherwise indicate that the targeting is accurate. The targeting may be processed on the client based on user movements without direct input from the server with reference to the targeting process. Game code related to targeting would reside on the client.

Figure 8:
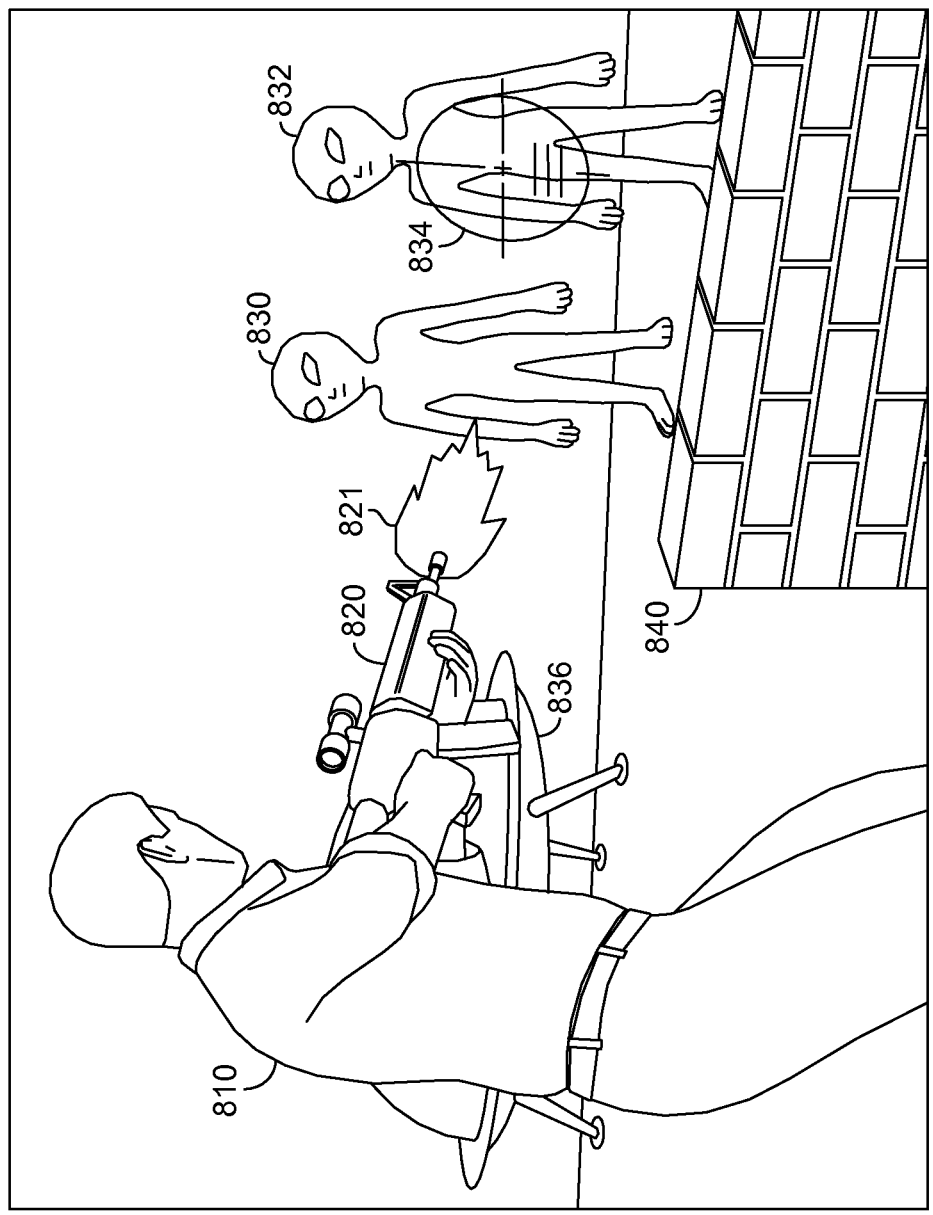
FIG. 8 is a diagram illustrating game interactions in a third-person shooter environment, in accordance with an embodiment of the present invention.

Turning now to FIG. 8, a delivery interaction within a third-person shooting environment is illustrated, in accordance with an embodiment of the present invention. A third-person shooting environment shows most of the character 810 controlled by the user of the client device. In this case, the character 810 is holding a rifle 820 that is pointed at alien 832, while alien 830 looks on. The spaceship 836 and brick wall 840 are also visible.

The reticle 834 and muzzle flash 821 are related to the delivery interaction. In this case, a bullet or output from the rifle 820 is delivered to the alien 832. Note that the reticle 834 may be part of a targeting and a delivery action. If the reticle 834 continues to be displayed during a delivery interaction, then it may also be considered part of the delivery interaction game features. Thus, game features may take part in different types of interactions.

In the case shown, the muzzle flash 821 and the reticle 834 may be client rendered as part of the game interaction. In addition to the visible manifestations, the client could generate audible manifestations of character interactions. For example, the client could generate shooting noises that are combined with audible signals received from the client. In one embodiment, all audio is client generated using game code. The game code may generate in the audio signals in response to state information received from the server.

In scene 800, the game character 810 and rifle 820 may be server rendered. In another embodiment, the game character 810 and/or rifle 820 may also be rendered on the client as part of the game interaction features. The alien 830, and 832 are server rendered along with the brick wall 840 and spaceship 836. Though not depicted, a hit manifestation on the alien 832 may be client rendered as part of the contact interaction feature. For example, the green alien 832 could turn red upon being hit. In another embodiment, the portion of the alien 832 hit turns red.

Both the targeting, delivery, and hit detection (or contact), which is not directly depicted in FIG. 8, may require the game code running on the game client to be able to ascertain the location of objects depicted within the scene and calculate a trajectory of an object delivered as part of the game interaction. In one embodiment, geometric shapes are used to calculate a game object's location in the scene. The geometric shapes may be downloaded or communicated from the server to the game client as game state information changes.

Figure 9:
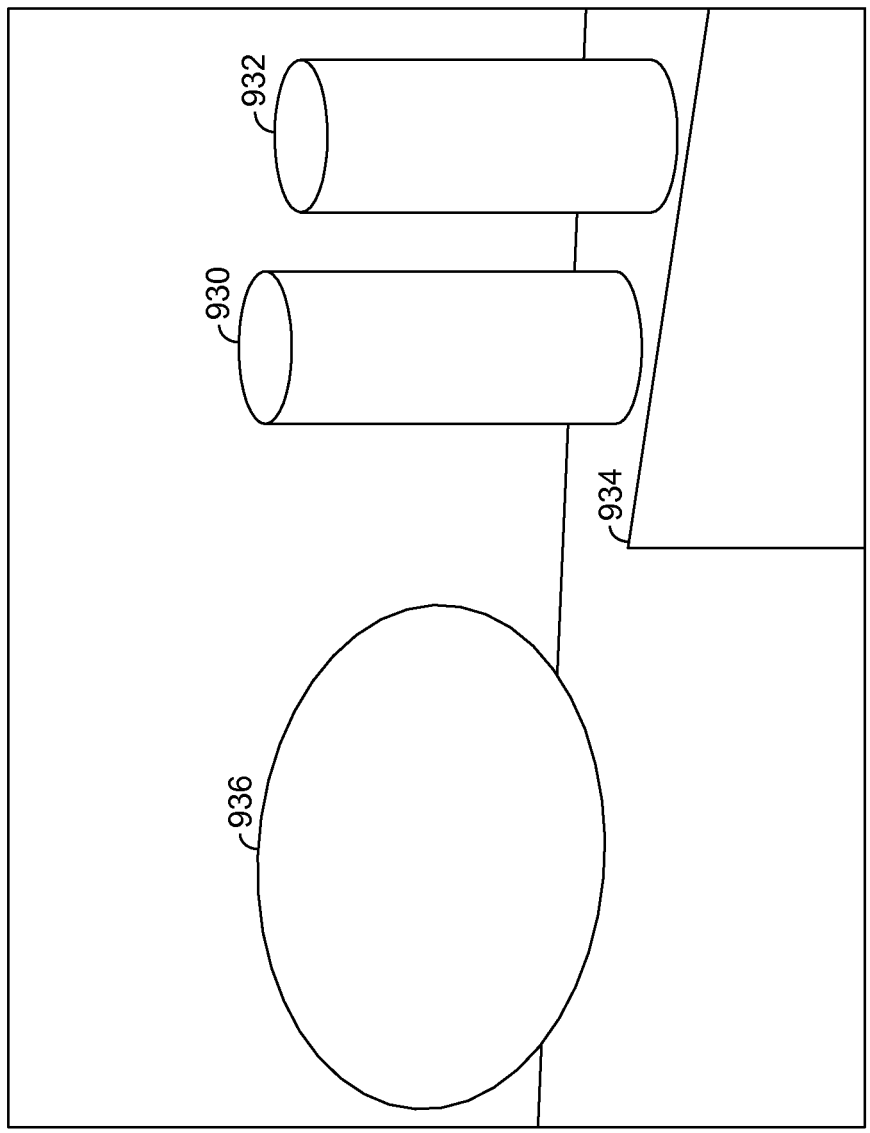
FIG. 9 is a diagram illustrating game objects depicted as geometric objects for the purpose of analyzing game interactions, in accordance with an embodiment of the present invention.

Turning now to FIG. 9, the depiction of game objects as geometric shapes is shown, in accordance with an embodiment of the present invention. The shapes are depicted in FIG. 9 for the sake of illustration. In reality, the shapes need not be rendered visually as any part of the game interaction process. Rather, the game objects' size, shape, and location may be consumed internally for the purpose of performing calculations involving the game interactions. The calculations may involve targeting, delivery of a projectile and hit detection.

As can be seen, the objects correspond with those shown in FIG. 8. The spaceship 836 is depicted as an oblong spheroid 936. The aliens are depicted as cylinders 930 and 932. The wall 840 is depicted as a plane 934. In one embodiment, only the front surface of the wall 840 is presented within the geometric shape data. The front surface of the wall 840 may be necessary to make sure that the game character does not walk through or shoot through or target through the wall. Similarly, a projectile would bounce off a wall rather than hit an object if the projectile was aimed at the wall.

Thus, the game code on the client device may be capable of both rendering manifestations of game interactions as well as performing calculations related to these interactions within the video game. As mentioned, these may be preliminary calculations that are duplicated on the game server. In one embodiment, the targeting information is not communicated to the game server, but entirely performed on the client. Upon receiving a control input to deliver an object toward the target, the control input is uploaded to the server, which performs a trajectory calculation in addition to a preliminary trajectory calculation performed on the client.

A preliminary hit manifestation may be generated on the client along with manifestations of the delivery such as the muzzle flash illustrated previously. For purposes of a multiplayer game, the ultimate hit calculation may reside with the server. The control input has a time code that is used to compare with the exact location of an object at the point in the game when the control was issued. Further, the server may use more sophisticated targeting processes that do not rely on the geometric shapes, but use shapes that more closely resemble the game object.

Figure 10:
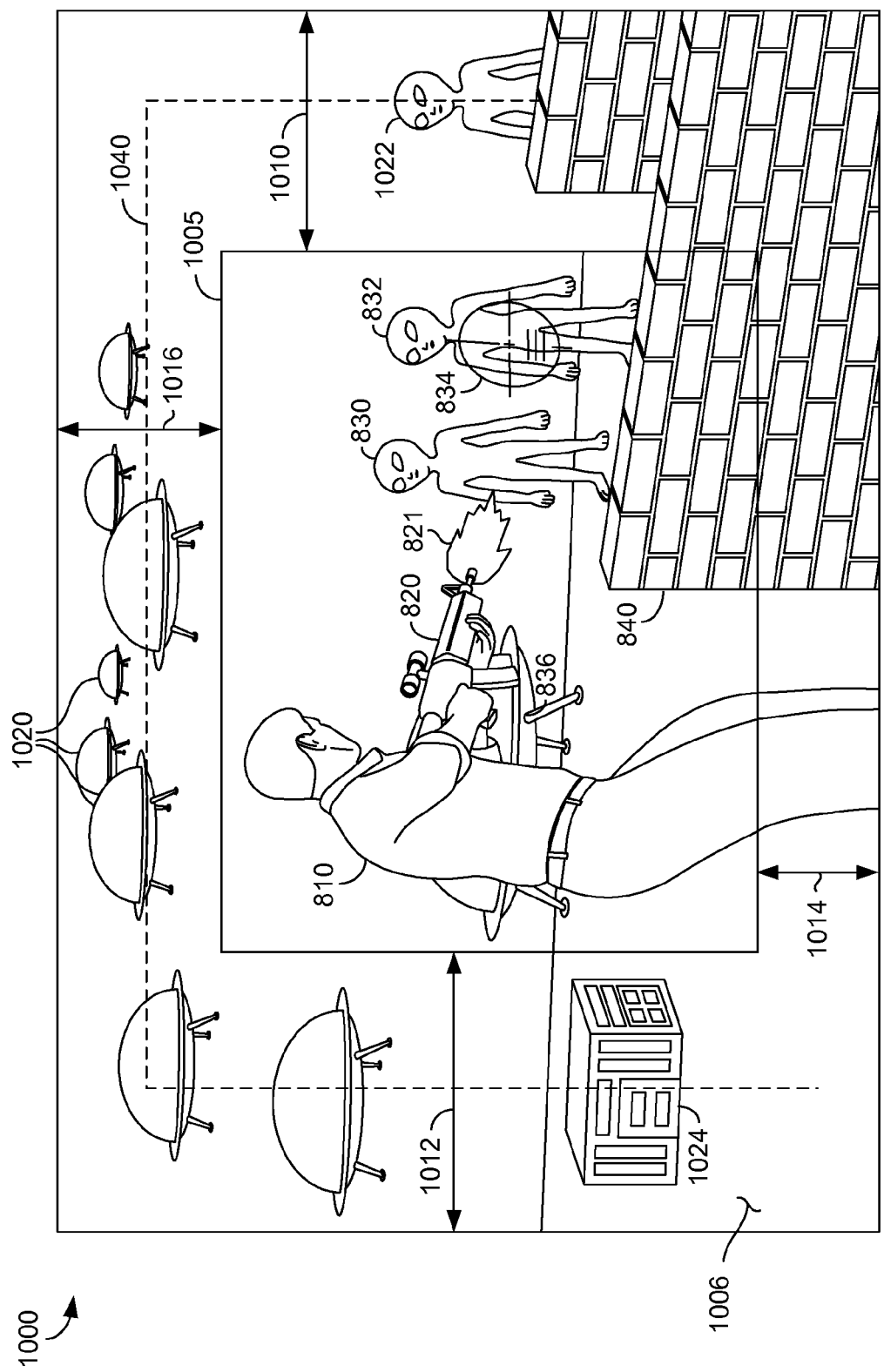
FIG. 10 is a diagram illustrating primary scene imagery and predictive scene imagery, in accordance with an embodiment of the present invention.

Turning now to FIG. 10, a rendered video game image 1000 that comprises both primary scene imagery and predictive scene imagery is shown, in accordance with an embodiment of the present invention. The primary scene imagery 1005 was shown and displayed previously with reference to FIG. 8. In one embodiment, the primary scene imagery 1005 is cropped out of the rendered image 1000 and displayed to the user. The predictive scene imagery extends in different directions for different amounts around the primary scene imagery 1005.

As can be seen, the predictive scene imagery extends a distance 1010 to the right, a distance 1012 to the left, a distance 1014 to the bottom and a distance 1016 to the top. Each distance may be different.

The predictive scene imagery may include background images as well as game objects. The predictive scene imagery shown in FIG. 10 includes additional alien spacecraft 1020, an alien 1022, a box 1024, and the continuation of wall 840. As mentioned previously, the amount of predictive scene imagery shown on different sides of the primary scene imagery may be determined based on a likelihood that it will be used or displayed to the user. For example, it may be more likely that the user would look up at the additional alien spaceships 1020 or the additional alien 1022 to the right than to look down or to the left.

The resolution of the predictive scene imagery may vary. Line 1040 indicates a potential demarcation line where the pixel density may decrease to conserve bandwidth when communicating the rendered image from the game server to the game client. The halfway point is just one example of where this demarcation line, which may not actually be displayed in the image but is just for the sake of illustration, could be made. In general, the further the predictive scene imagery is from the primary scene imagery 1005, the less likely it is to be used to generate an image shown to the user. Also, notice that the line 1040 does not extend down. It may not be desirable to decrease the resolution of images that appear in the foreground. On the other hand, predictive scenery that is mostly in the background or to the edges of the screen may be suitable for lower resolution rendering. Variations within the resolution of the predictive scene imagery may depend on the bandwidth available to a particular user. When less bandwidth is available, the part of the predictive imagery rendered with a lower resolution may increase.

Figure 11:
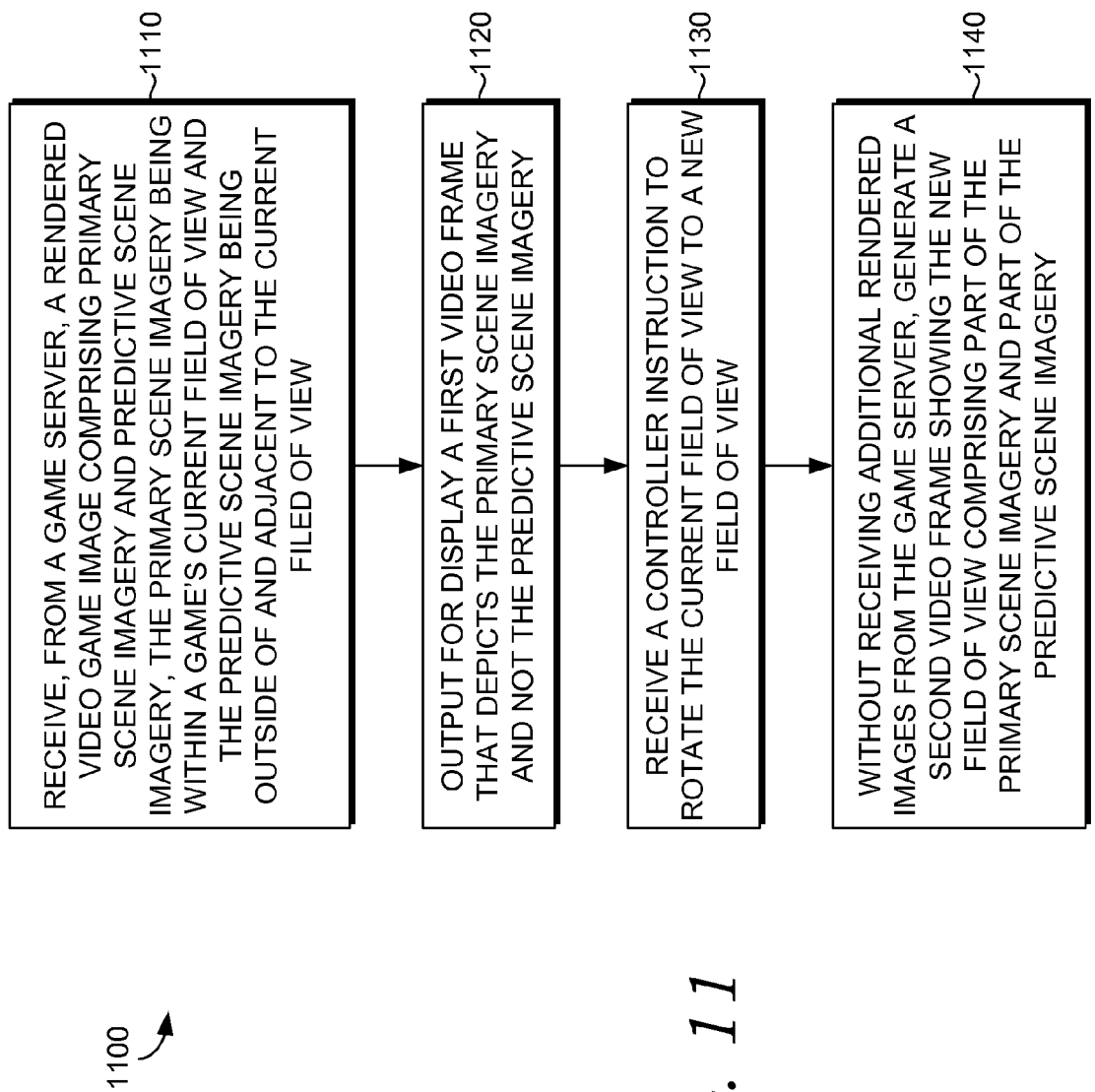
FIG. 11 is a flow chart showing a method of client-rendering player movement in a server-based gaming environment, in accordance with an embodiment of the present invention.

Turning now to FIG. 11, a method 1100 of client-rendering player movement in a server-based gaming environment is shown, in accordance with an embodiment of the present invention. As mentioned, the server-based gaming environment is one where at least part of the video game image is rendered on the game server and communicated to a game client. Additionally, the game code and game state may be managed and manipulated on the server. However, portions of the final image shown to the user may be rendered on the client. For example, various targeting functions may be rendered on the client and composited with the server rendered image to generate a final image that is shown to the user. Thus, portions of the game code may be executed on a client and some images may be rendered on the client and combined with images rendered by the server. Though, in one embodiment, the entire video game image is rendered on the server.

At step 1110, a rendered video game image comprising primary scene imagery and predictive scene imagery is received from a game server. The primary scene imagery is within a game's current field of view and the predictive scene imagery is outside of and adjacent to the current field of view. An example of primary scene imagery and predictive scene imagery has been described previously with reference to FIG. 10.

At step 1120, a first video frame that depicts the primary scene imagery, and not the predictive scene imagery, is output for display by a game client. The predictive scene imagery may have been cropped out of the rendered video game image received from the server. The present field of view may be determined on the client for the purpose of cropping. In another embodiment, the game server provides the extents of the current field of view to the game client for use in cropping.

At step 1130, an instruction to rotate the current field of view to a new field of view is received. The controller instruction may be generated by a game pad, or other game controller connected to the game client. The instruction to rotate the current field of view may be an instruction to move the primary player and the result is that the field of view must also rotate with the player. This controller instruction is also communicated to the game server, which begins updating the game state information and generating a second rendered image.

At step 1140, without receiving additional rendered images from the game server, a second video frame showing the new field of view is generated. The new field of view comprises part of the primary scene imagery and, at least, part of the predicted scene imagery. The second frame is generated before additional rendered image can be received from the game server. When the next rendered image is received from the game server, the two are reconciled to create the new current field of view. The second rendered image received from the game client may also include additional predictive scene imagery just like the first rendered video game image. In this way, seamless rotation is provided on the client side without lag that may result from latency introduced by the online connection between the game server and game client and other processing.

Figure 12:
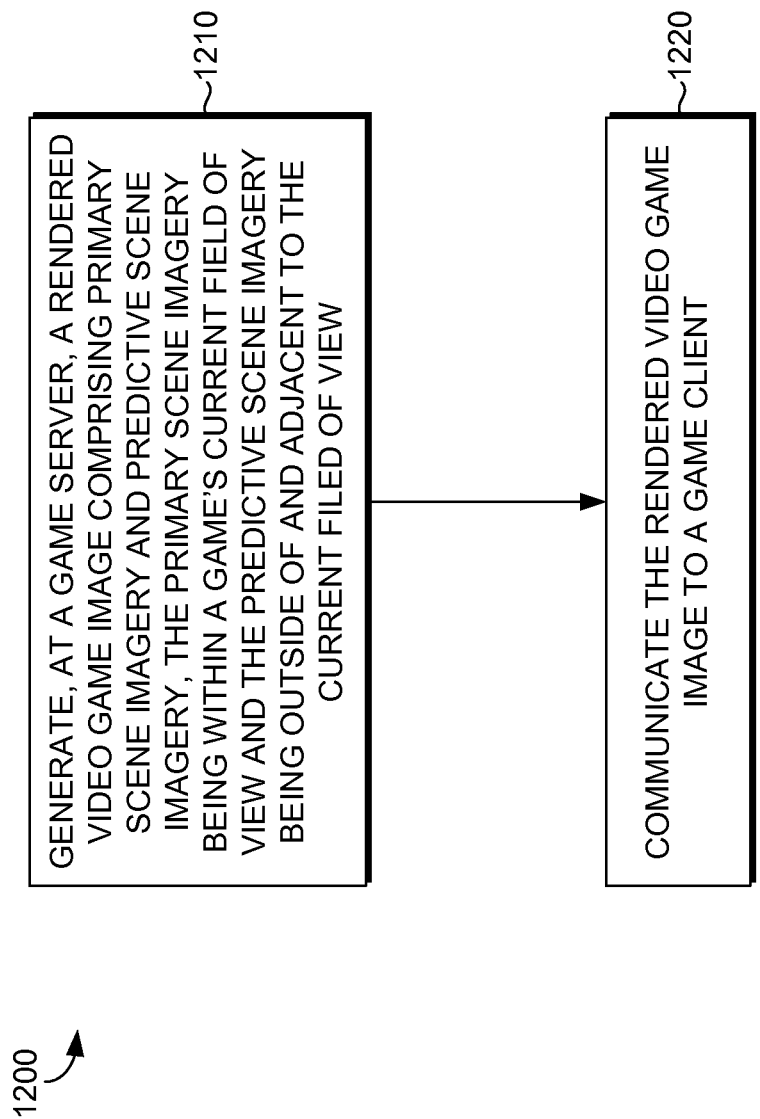
FIG. 12 is a flow chart showing a method of generating predictive video game player movement in a server-based gaming environment, in accordance with an embodiment of the present invention.

Turning now to FIG. 12, a method 1200 of generating predictive video game player movement in a server-based gaming environment is shown, in accordance with an embodiment of the present invention. The server-based gaming environment may be as described previously in FIG. 3 The game server renders at least part of the image ultimately displayed to the user.

At step 1210, a video game image comprising primary scene imagery and predictive scene imagery is generated at a game server. The primary scene imagery is within a game's current field of view and the predictive scene imagery is outside of and adjacent to the current field of view. At step 1220, the rendered video game image is communicated to a game client.

As mentioned, the predictive scene imagery is sized to allow the game client to generate new image frames that rotate the field of view without running out of imagery until a new rendered video game image can be generated by the game server and communicated to the game client. The amount of time it takes for a new image to be generated by the game server and communicated to the client may be dependent on the network connection between the game client and server. Thus, initially the speed of this connection may be determined and used to the calculate a size of the predictive scene imagery. As mentioned, a size of the predictive imagery may be determined by calculating how far the current field of view is capable of rotating at a predicted velocity during the time that lapses between the rendered video game image and a subsequent rendered video game image being communicated to the client.

The predicted velocity could be a maximum rotation rate possible within the game title. Different game titles may have different maximum rotation rates. The predicted velocity could be a maximum rotation rate previously achieved by a user within the game title. As the user plays the game, this amount could be changed based on observed actions. In one embodiment, the predicted velocity is a maximum rotation rate previously achieved by players at a similar game situation. Other methods of calculating the predictive velocity have been described previously.

Figure 13:
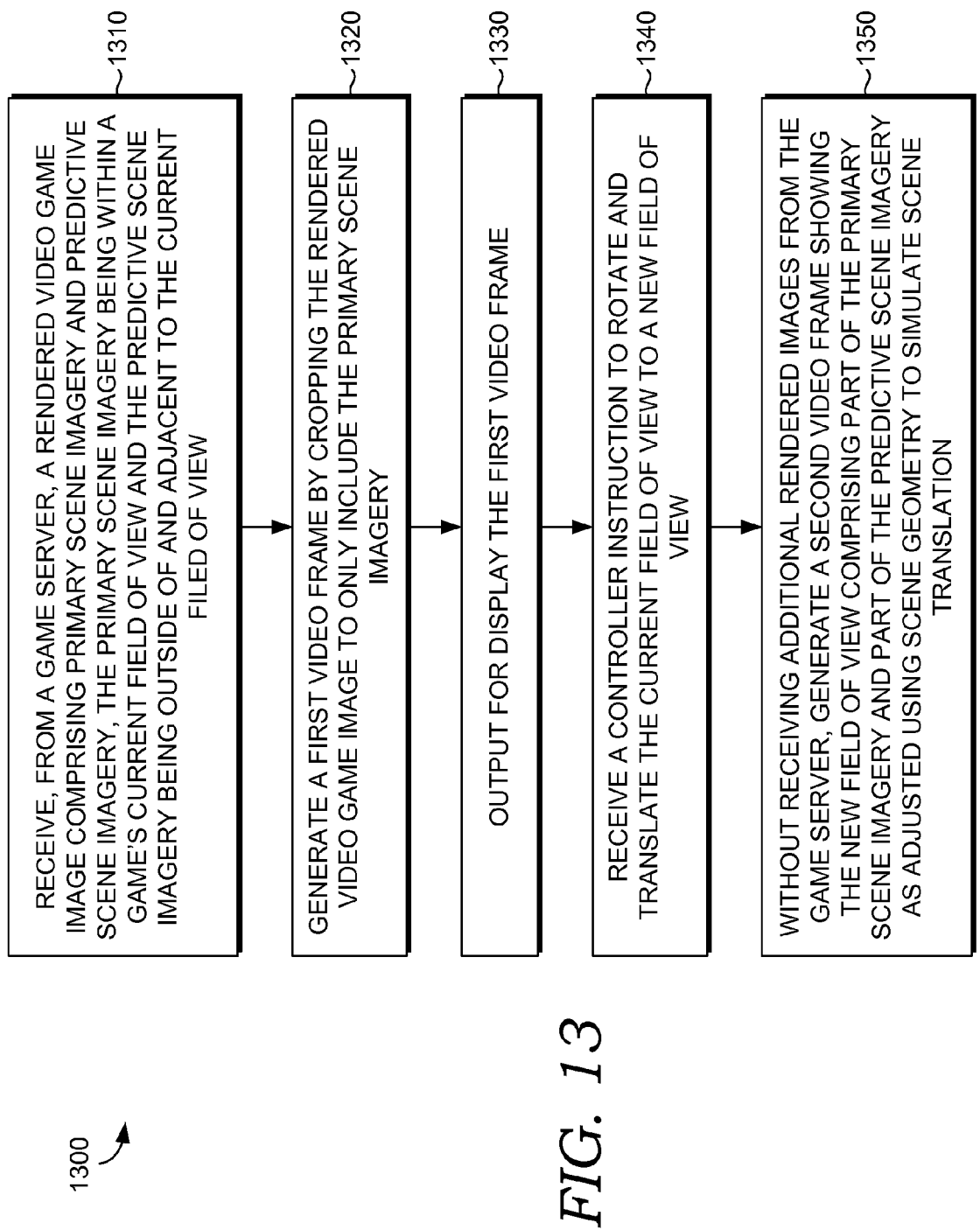
FIG. 13 is a flow chart showing a method of client-rendering player movement in a server-based gaming environment, in accordance with an embodiment of the present invention.

Turning now to FIG. 13, a method 1300 of client-rendering player movement in a server-based gaming environment is shown, in accordance with an embodiment of the present invention. At step 1310, a rendered video game image comprising primary scene imagery and predictive scene imagery is received from a game server. The primary scene imagery is within a game's current field of view and the predictive scene imagery is outside of and adjacent to the current field of view. At step 1320, a first video frame is generated by cropping the rendered video game image to include only the primary scene imagery. At step 1330, the first video frame is output for display.

At step 1340, a controller instruction to rotate and translate the current field of view to a new field of view is received. The controller instruction may be an instruction to rotate and move the player, which causes the field of view to move along with the player in response.

At step 1350, without receiving additional rendered images from the game server, a second video frame showing the new field of view comprising part of the primary scene imagery and part of the predictive scene imagery as adjusted using scene geometry to simulate scene translation is generated. The second video frame may be output for display to the user. Thus, in addition to using the predictive scene imagery, the images are adjusted based on geometry to simulate the player moving in the instructed direction. This adjustment is done by using the existing pixel data and applying it to the geometry from the new location. The result is a smoother translation from image to image as they are received from the game server.

The invention claimed is:

1. One or more computer-storage media having computer-executable instructions embodied thereon that, when executed by a computing device, perform a method of client-rendering player movement in a server-based gaming environment, the method comprising:
   receiving, from a game server, a rendered video game image comprising primary scene imagery and predictive scene imagery, the primary scene imagery being within a game's current field of view and the predictive scene imagery being outside of and adjacent to the current field of view;
   outputting for display a first video frame that depicts the primary scene imagery and not the predictive scene imagery;
   receiving a controller instruction to rotate the current field of view to a new field of view; and
   without receiving additional rendered images from the game server, generating, at a game client, a second video frame showing the new field of view comprising part of the primary scene imagery and part of the predictive scene imagery.

2. The media of claim 1, wherein the method further comprises cropping the rendered video game image to include only the primary scene imagery.

3. The media of claim 1, wherein the method further comprises communicating the controller instruction to the game server.

4. The media of claim 1, wherein the predictive scene imagery is rendered in a lower resolution than the primary scene imagery.

5. The media of claim 4, wherein a resolution of the predictive scene imagery decreases further from the current field of view.

6. The media of claim 1, wherein the predictive scene imagery is sized based on maximum rotation rate within a video game title.

7. The media of claim 1, wherein the predictive scene imagery is sized based on speed of a network connection between the game server and the game client.

8. One or more computer-storage media having computer-executable instructions embodied thereon that, when executed by a computing device, perform a method of generating predictive video game player movement in a server-based gaming environment, the method comprising;
generating, at a game server, a rendered video game image comprising primary scene imagery and predictive scene imagery, the primary scene imagery being within a game's current field of view and the predictive scene imagery being outside of and adjacent to the current field of view; and
communicating the rendered video game image comprising primary scene imagery and predictive scene imagery to a game client.

9. The media of claim 8, wherein the predictive scene imagery is sized to allow the game client to generate new image frames that rotate the current field of view without running out of imagery until a new rendered video game image can be generated by the game server and communicated to the game client.

10. The media of claim 8, wherein a width of the predictive scene imagery is determined by calculating how far the current field of view rotates at a predicted velocity between communicating the rendered video game image and a subsequent rendered video game image to the game client.

11. The media of claim 10, wherein the predicted velocity is the maximum rotation rate possible within a game title.

12. The media of claim 10, wherein the predicted velocity is a maximum rotation rate previously achieved by a user within a game title.

13. The media of claim 10, wherein the predicted velocity is a maximum rotation rate previously observed under similar game circumstances within a game title.

14. The media of claim 10, wherein the predicted velocity is based on a style of play for a user.

15. The media of claim 10, wherein the predicted velocity is calculated based on observed rates of rotation at a present point in a game, the observed rates being made for multiple users over time.

16. The media of claim 8, wherein the method further comprises communicating game geometry to the game client for the current field of view.

17. The media of claim 8, wherein the method further comprises communicating to the game server a game code that renders latency-sensitive features.

18. A method of client-rendering player movement in a server-based gaming environment, the method comprising:
receiving, from a game server, a rendered video game image comprising primary scene imagery and predictive scene imagery, the primary scene imagery being within a game's current field of view and the predictive scene imagery being outside of and adjacent to the current field of view;
generating a first video frame by cropping the rendered video game image to include only the primary scene imagery;
outputting for display the first video frame;
receiving a controller instruction to rotate and translate the current field of view to a new field of view; and
without receiving additional rendered images from the game server, generating a second video frame showing the new field of view comprising part of the primary scene imagery and part of the predictive scene imagery as adjusted using scene geometry to simulate scene translation.

19. The method of claim 18, wherein the method further comprises receiving scene geometry from the game server.

20. The method of claim 18, wherein the predictive scene imagery is sized to allow the game client to generate new image frames that rotate the current field of view without running out of imagery until a new rendered video game image can be generated by the game server and communicated to the game client.

* * * * *